(12) United States Patent
Mochizuki

(10) Patent No.: US 12,111,486 B2
(45) Date of Patent: Oct. 8, 2024

(54) OPTICAL FILTER AND IMAGING LENS UNIT

(71) Applicant: Nittoh Inc., Nagano (JP)

(72) Inventor: Keiichi Mochizuki, Nagano (JP)

(73) Assignee: NITTOH INC., Nagano (JP)

( * ) Notice: Subject to any disclaimer, the term of this patent is extended or adjusted under 35 U.S.C. 154(b) by 526 days.

(21) Appl. No.: 17/602,731

(22) PCT Filed: Feb. 13, 2020

(86) PCT No.: PCT/JP2020/005542
§ 371 (c)(1),
(2) Date: Oct. 8, 2021

(87) PCT Pub. No.: WO2020/208935
PCT Pub. Date: Oct. 15, 2020

(65) Prior Publication Data
US 2022/0171106 A1 Jun. 2, 2022

(30) Foreign Application Priority Data
Apr. 11, 2019 (JP) .................................. 2019-075347

(51) Int. Cl.
*G02B 5/20* (2006.01)
*G02B 5/02* (2006.01)
(Continued)

(52) U.S. Cl.
CPC ............ *G02B 5/206* (2013.01); *G02B 5/0242* (2013.01); *G02B 5/0294* (2013.01); *G02B 7/006* (2013.01); *G02B 7/021* (2013.01)

(58) Field of Classification Search
CPC ...... G02B 5/206; G02B 5/205; G02B 5/0242; G02B 5/0294; G02B 5/0236; G03B 11/00
See application file for complete search history.

(56) References Cited

U.S. PATENT DOCUMENTS

2008/0030860 A1  2/2008  Chang
2009/0244745 A1  10/2009  Komuro
(Continued)

FOREIGN PATENT DOCUMENTS

DE  3810946 A1 * 11/1988
EP  3531175 A1  8/2019
(Continued)

OTHER PUBLICATIONS

Extended European Search Report in EP Application No. 20786693.0, dated Dec. 21, 2022, 8pp.
(Continued)

*Primary Examiner* — Ryan D Howard
(74) *Attorney, Agent, or Firm* — HAUPTMAN HAM, LLP

(57) ABSTRACT

An optical filter includes: a base material; and a plurality of light scattering particles mixed into the base material. The plurality of light scattering particles include a plurality of scattering elements which differ from each other in a manner of appearance of "scattered light intensity distribution for respective wavelengths". With such a configuration, it is possible to provide the optical filter which is an optical filter can be manufactured without using a method which roughens the surface of the optical filter and is an optical filter for soft focusing which can suppress the occurrence of an iris phenomenon. It is also possible to provide a lens unit which can suppress the occurrence of an iris phenomenon.

5 Claims, 13 Drawing Sheets

(51) Int. Cl.
*G03B 11/00* (2021.01)
*G02B 7/00* (2021.01)
*G02B 7/02* (2021.01)

(56) References Cited

U.S. PATENT DOCUMENTS

| | | |
|---|---|---|
| 2012/0286314 A1 | 11/2012 | Shinohara et al. |
| 2017/0062765 A1 | 3/2017 | Yang et al. |
| 2017/0351009 A1* | 12/2017 | Matsuo ................ G03B 21/625 |
| 2018/0088268 A1 | 3/2018 | Kondo et al. |

FOREIGN PATENT DOCUMENTS

| | | | |
|---|---|---|---|
| JP | H5257002 | A | 10/1993 |
| JP | 2000111714 | A | 4/2000 |
| JP | 2009145842 | A | 7/2009 |
| JP | 2010168464 | A | 8/2010 |
| JP | 2011150790 | A | 8/2011 |
| JP | 201333208 | A | 2/2013 |
| WO | 2016195015 | A1 | 12/2016 |
| WO | 2018074527 | A1 | 4/2018 |

OTHER PUBLICATIONS

Haruo Sato, "The 51st night Nikon SoftFocus Filter Soft1, Soft2", 2021, https://www.nikon-image.com/enjoy/life/historynikkor/0051/index.html., Nikon Corporation, Nikon Imaging Japan Inc., 30pp.
International Search Report in PCT/JP2020/005542, mailed Apr. 28, 2020. 6pp.

\* cited by examiner case where scattering particle size is 6.8 μm

OPTICAL FILTER AND IMAGING LENS UNIT

RELATED APPLICATIONS

The present application is a National Phase of International Application Number PCT/JP2020/005542, filed Feb. 13, 2020, which claims priority to Japanese Application number 2019-075347, filed Apr. 11, 2019.

TECHNICAL FIELD

The present invention relates to an optical filter and an imaging lens unit that uses the optical filter.

BACKGROUND ART

There may be a case where a photographer uses an optical filter for soft focusing to give a soft texture having a blurring effect to an imaged image or a picture. Here, "blurring" means a treatment or a state which is also referred to as "soft focal pointing or soft focusing". Accordingly, in the description made hereinafter, "blurring" may also be described as "soft focusing".

Conventionally, there has been popularly known a technique where a surface of a filter is roughened or unevenness is formed on the surface of the filter to obtain an optical filter for soft focusing. However, the conventional optical filter for soft focusing has a problem that a scratch, unevenness or the like formed on a surface of the filter is reflected as a shade (see non-patent literature 1, for example).

On the other hand, there has also been proposed a technique where light scattering particles are mixed into a base material for obtaining a light diffusion plate for a display, although the technique does not relate to an optical filter (see patent literature 1, for example).

It is considered that an optical filter for soft focusing is formed using such a technique. Under such circumstances, inventors of the present invention have made studies and development based on such an idea, and have prepared an optical filter (an optical filter of a comparative example).

FIG. 15A and FIG. 15B are views for describing an optical filter 9 of the comparative example.

FIG. 15A is a view showing the arrangement of an evaluation system used in evaluating the optical filter 9 of the comparative example. At first, as the optical filter 9 of the comparative example, an optical filter which is formed by mixing silicone particles having an average particle size of 4 μm into a base material (not shown in the drawing) is prepared. The optical filter 9 has a flat plate shape, and optical power of the optical filter 9 is set to 0 (a focal distance being infinite). An object OB (a spotlight, here) which forms an object to be imaged is placed in a dark room, and the optical filter 9 is disposed at a side opposite to a side where the object OB is disposed with a lens system LSS being sandwiched between the object OB and the optical filter 9. Symbol IP indicates an imaging plane.

FIG. 15B is an actual photograph where an image on the imaging plane IP is imaged using the optical filter 9 of the comparative example. According to the optical filter 9 of the comparative example, in the actual photograph, the surrounding of an outline of a spotlight (disposed at a position slightly on a left side of the center in the photograph) is softly blurred, and a halo is generated in a right direction based on light emitted from the spotlight.

However, in the actual photograph, according to the optical filter 9 of the comparative example, an iris is generated in the blurred portion and the halo. Although it is difficult to confirm an iris phenomenon since FIG. 15B is a monochrome image. a color image which is an original of FIG. 15B apparently shows a state where colors are separated sequentially in a right direction from the spotlight thus generating an iris phenomenon (see a tip of an arrow indicated by symbol IR).

It is preferable for an optical filter for soft focusing that unevenness or the like on a surface of the filter be not reflected as a shade and an iris is not generated in a focused image formed by soft focusing.

CITATION LIST

Patent Literature

Non-Patent literature 1: Sato Haruo "Nikkor Senyaichiya Monogatari, 51th night, Nikon Softfocus Filter Soft1, Soft2", [online] [Retrieved on Jan. 17, 2019], Nikon HP Internet (URL: https://www.nikon-image.com/enjoy/life/historynikkor/0051/index.html)

Patent Literature 1: JP-H5-257002 A

SUMMARY OF INVENTION

Technical Problem

The present invention has been made in view of such circumstances, and it is an object of the present invention to provide an optical filter for soft focusing which is manufactured by a method which does not roughen a surface of the optical filter and can suppress the occurrence of an iris phenomenon. It is another object of the present invention to provide a lens unit which can suppress the occurrence of an iris phenomenon.

Solution to Problem

Inventors of the present invention have found that, by preparing plural kinds of scattering elements which differ from each other in scattered light intensity distribution (pattern) for respective wavelengths, by blending these different kinds of scattering elements and by mixing such scattering elements into an optical filter, wavelength dependency of scattered light intensity can be eliminated so that the occurrence of an iris phenomenon can be suppressed. The present invention is formed of the following constitutional elements.

[1] An optical filter according to the present invention includes: a base material; and a plurality of light scattering particles mixed into the base material, wherein the plurality of light scattering particles contain a plurality of scattering elements which differ from each other in a manner of appearance of "scattered light intensity distribution for respective wavelengths".

With respect to the above-mentioned configuration, although the detailed definition of "scattered light intensity distribution for respective wavelengths" is made later, roughly speaking, "scattered light intensity distribution for respective wavelengths" is a pattern relating to a scattered light intensity corresponding to a scattering angle.

[2] In the optical filter according to the present invention, it is preferable that the plurality of light scattering particles be formed of a plurality of particles having a spherical shape and having different sizes from each other.

[3] In the optical filter according to the present invention, it is preferable that the plurality of light scattering particles be formed of a plurality of particles having different shapes from each other.

[4] In the optical filter according to the present invention, it is preferable that each of the plurality of light scattering particles be formed of a particle having a plurality of small protruding portions on a surface of a spherical particle.

[5] In the optical filter described in the above-mentioned [2], it is preferable that assuming an average particle size of the particles having a spherical shape and contained in the optical filter as Φ and a total number of the particles having a spherical shape as Ns, the optical filter contain 0.1 Ns pieces or more of the particles having an average particle size which falls within a range of from 0.4Φ to 0.6Φ, and 0.1 Ns pieces or more of the particles having an average particle size which falls within a range of from 1.3Φ to 1.8Φ.

In other words, it is preferable that the optical filter described in the above-mentioned [2] contain at least 10% of the particles having an average particle size which falls within a range of from 40% to 60% with respect to 0, and 10% or more of the particles having an average particle size which falls within a range of from 130% to 180% with respect to Φ.

[6] In the optical filter described in the above-mentioned [5], it is preferable that the optical filter contain 0.5 Ns pieces or more of particles having a spherical shape and having an average particle size which falls within a range of from 0.9Φ to 1.1Φ. In other words, it is preferable that the optical filter contain 50% or more of the particles having a spherical shape and having an average particle size of ±10% with respect to Φ.

[7] In the optical filter described in the above-mentioned [5] or [6], it is preferable that the plurality of particles having a spherical shape which are mixed into the base material be different by at least 8 μm or more in a particle size.

[8] An imaging lens unit according to the present invention includes: an imaging lens; and the optical filter according to any one of the above-mentioned [1] to [7], wherein power of the optical filter is substantially 0 (zero).

With respect to the above-mentioned configuration, "power" means a strength of the optical filter which bends light as a lens, and corresponds to an inverse number of a focal distance. The optical filter where "power is substantially 0 (zero)" is, for example, an optical filter which exhibits substantially no change in length of the focal distance before the insertion of the optical filter into a predetermined optical system and after such insertion of the optical filter. That is, "power is 0 (zero)" means that the focal distance is infinite.

[9] An imaging lens unit according to the present invention includes: an imaging lens; and the optical filter according to any one of the above-mentioned [1] to [7], wherein the optical filter has negative power.

With respect to the above-mentioned configuration, "negative power" means an optical action which disperses light which passes through the optical filter (positions a focal position at a light incident side).

[10] An imaging lens unit according to the present invention includes: an imaging lens; and the optical filter according to any one of the above-mentioned [1] to [7], wherein the imaging lens unit includes: the optical filter having negative power; and a transparent member made of a same material as the base material of the optical filter, and integrally formed with the optical filter by being connected to a recessed surface of the optical filter, wherein power of an integral body formed of the optical filter and the transparent member is substantially set to 0 (zero).

DESCRIPTION OF EMBODIMENTS

Figure 1A:
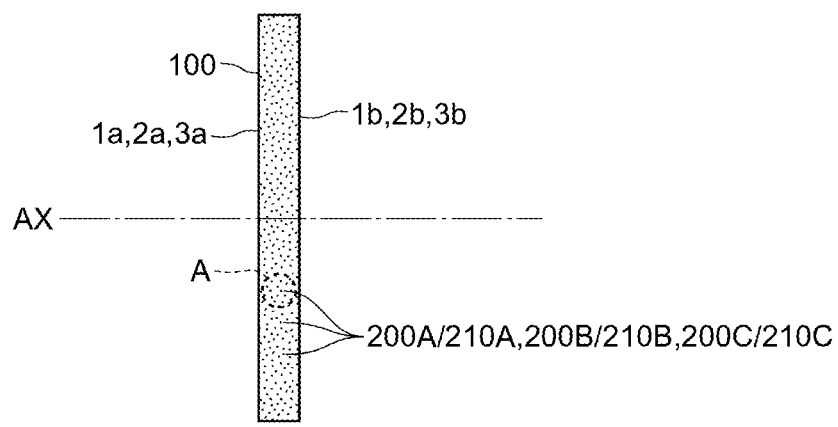
FIG. 1A and FIG. 1B are views for describing an optical filter 1 according to an embodiment 1.

Hereinafter, an optical filter and an imaging lens unit according to the present invention are described based on an embodiment shown in the drawings. The respective drawings are schematic views, and do not necessarily reflect actual sizes strictly.

Embodiment 1

1. Configuration of Optical Filter 1 According to Embodiment 1

Figure 1B:
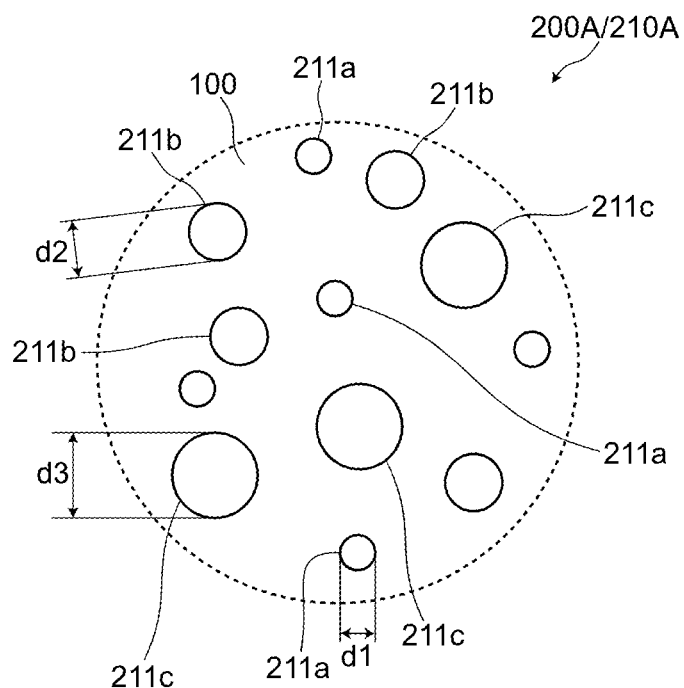

FIG. 1A and FIG. 1B are views for describing an optical filter 1 according to the embodiment 1. FIG. 1A is a right side view of the optical filter 1 as viewed from a right side in a state where a first main surface 1a of the optical filter 1 is set as a front surface and a second main surface 1b is set as a back surface. Symbol AX indicates an optical axis. FIG.

1B is an enlarged cross-sectional view of a main part showing a portion surrounded by a broken line A in FIG. 1A in an enlarged manner.

Macroscopically speaking, external appearances of an optical filter 2 according to an embodiment 2 and an optical filter 3 according to an embodiment 3 described later are basically not different from an external appearance of the optical filter 1. Accordingly, in FIG. 1A, the filter having the same flat plate shape in common is illustrated in the drawing, and symbols are given to the filters respectively so as to indicate the optical filters 1, 2 and 3 according to the embodiments 1 to 3. Also with respect to the optical filters 1, 2 and 3 of the embodiments 1 to 3, the constitutional elements are shown in a same figure, such as a first main surface 1a, 2a, 3a, a second main surface 1b, 2b, 3b, a plurality of light scattering particles 200A, 200B, 200C, a plurality of scattering elements 210A, 210B, 210C and the like, while using the same symbol for the same common element.

(1) Basic Constitution of Optical Filter 1

The optical filter 1 is an optical filter for so-called soft focusing.

As shown in FIG. 1A, the optical filter 1 is formed in a "flat plate shape" having the first main surface 1a and the second main surface 1b. The optical filter 1 uses a homogeneous base material 100 (described later) as a base, and the first main surface 1a and the second main surface 1b have an approximately parallel relationship with each other. Accordingly, power of the optical filter 1 is substantially 0 (zero).

When the optical filter 1 is viewed along the optical axis AX, the optical filter 1 may have an approximately circular shape in its entirety. A portion of the optical filter 1 may be formed in a shape where a diameter of the portion aligns with an inner diameter or an outer diameter of a lens barrel (described later) so that the optical filter 1 is fitted in or on the lens barrel. Further, the entirety of the optical filter 1 may have an approximately rectangular shape, and may be arranged at a front side (an object-to-be-imaged side) of the imaging lens unit, or may be flipped from the front side of the imaging lens unit and may be retracted from an optical path of the imaging lens unit. In this manner, a suitable shape can be adopted as the flat surface shape of the optical filter 1.

The optical filter 1 has: the base material 100; and a plurality of light scattering particles 200A mixed into the base material 100.

The plurality of light scattering particles 200A are mixed into the base material 100 such that the number of light scattering particles 200A per unit volume becomes substantially equal. That is, to reduce scattering irregularities caused by difference in density depending on portions through which light passes and to reduce irregularities in suppression of an iris phenomenon caused by difference in density depending on the portions through which light passes, the light scattering particles 200A are dispersed in the base material 100 at substantially uniform density.

(2) Base Material 100

The base material 100 may be any material provided that the base material 100 can ensure transparency to a certain extent. In the first embodiment 1, an acrylic resin is used as the base material 100. Specifically, a polymethylmethacrylate (PMMA) is used.

(3) Light Scattering Particles 200A

The light scattering particles 200A can be disposed in the base material 100 by being mixed into the base material 100. Any material can be used for forming the light scattering particles 200A provided that light incident on the base material 100 can generate scattering of light when the light impinges on the light scattering particles 200A. In the embodiment 1, particles made of polymer are used as the light scattering particles 200A. Specifically, particles made of a silicone resin are used as the light scattering particles 200A.

(4) Relationship Between Refractive Index of Base Material 100 and Light Scattering Particles 200A It is preferable that the difference between the refractive index of the base material 100 and the refractive index of the light scattering particles 200A be approximately 0.05. It is unnecessary that the difference between these refractive indexes is 0.05 strictly, and the difference between the refractive indexes may be a value which is above or below 0.05 within a practical use range where the manner of operation and the advantageous effects according to the embodiment 1 can be acquired (hereinafter simply referred to as "within a practical use range").

For example, when the above-mentioned material is adopted, the refractive index of the PMMA which forms the base material 100 is approximately 1.4918 with respect to a d line (587.56 nm). On the other hand, the refractive index of a silicone resin which forms the light scattering particles 200A is approximately 1.4401 with respect to the d line. Accordingly, in the above-mentioned case, the difference between the refractive index of the base material 100 and the refractive index of the light scattering particles 200A is 0.0517 and hence, the desired difference between the refractive indexes is acquired.

(5) Particles 211 Having Spherical Shape and Having Different Sizes from Each Other In the optical filter 1 according to the embodiment 1, "the plurality of light scattering particles 200A" are formed of a plurality of particles 211 (211a, 211b, 211c . . . ) having a spherical shape which differ in size (diameter) from each other.

As shown in FIG. 1B, specifically, "the plurality of light scattering particles 200A" is formed of "a group of true spherical particles having different sizes" such as first true spherical particles 211a having a size (diameter) d1, second true spherical particles 211b having a size (diameter) d2, third true spherical particles 211c having a size (diameter) d3 . . . (d1, d2, d3 . . . being values which differ from each other). For example, "the plurality of light scattering particles 200A" may be formed of plural kinds of true spherical particles having sizes (dimeters) of 3 μm, 4 μm, 5 μm, 6 μm, 7 μm, 8 μm, 9 μm which are prepared at the same amount.

In this embodiment, the "spherical shape" means a true spherical shape. However, it is unnecessary that "spherical shape" means a true spherical shape in a strict meaning of the term. For example, particles having an elliptical body shape may also be included in light scattering particles having the "spherical shape" within a practical use range.

However, it is preferable that the shape of the light scattering particle be a substantially true spherical shape. This is because light scattering particles having a true spherical shape can be relatively easily acquired, and a control can be easily performed in leveling the deviation of scattered light intensities at respective wavelengths as described later.

(6) Scattering by Single True Spherical Particle

Next, the concept of "scattering elements" in the embodiment 1 is described with reference to FIG. 2A, FIG. 2B and FIG. 2C.

Figure 2A:
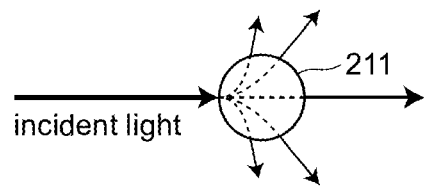
FIG. 2A, FIG. 2B and FIG. 2C are views for describing the distribution of scattered light intensity corresponding to scattering angles when light impinges on a single true spherical particle.
Figure 2B:
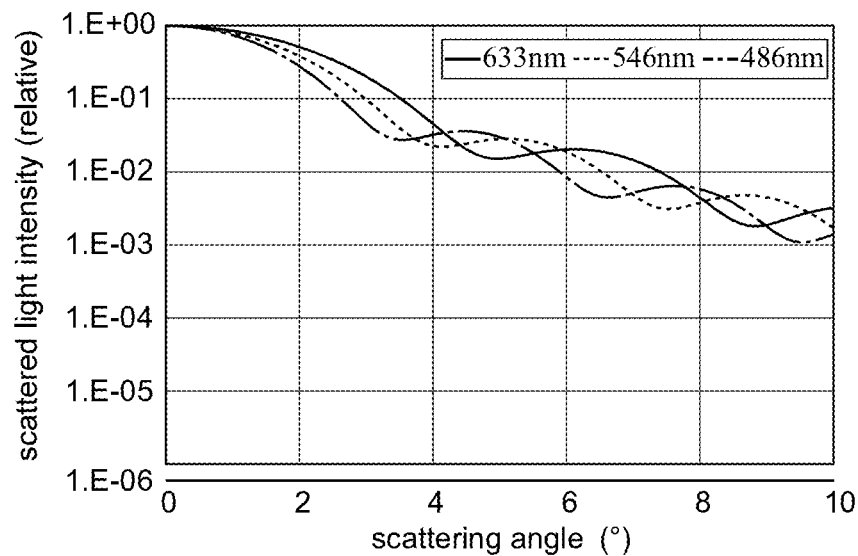
Figure 2C:
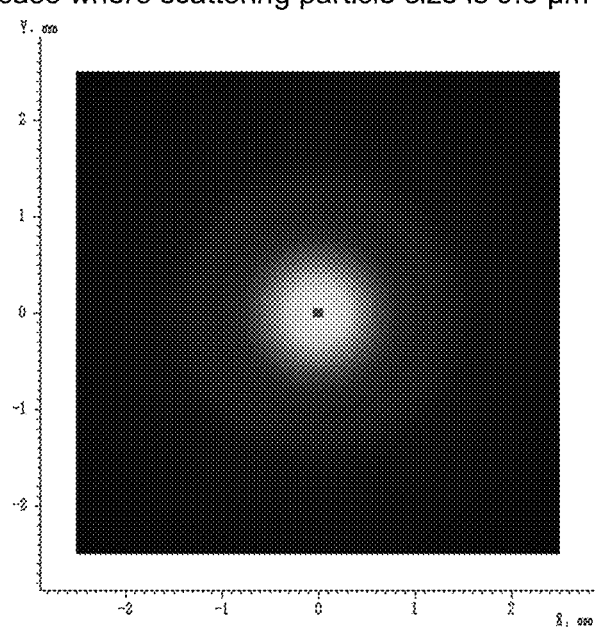

FIG. 2A, FIG. 2B and FIG. 2C are views for describing the distribution of scattered light intensities corresponding to scattering angles when light impinges on a single true spherical particle. FIG. 2A is a view schematically showing a state where light impinges on the single true spherical particle (the particle 211 having a spherical shape) and the light scatters. In the drawing, the directions indicated by arrows schematically exemplify advancing directions of lights, and lengths of the arrows schematically exemplify intensities of the light.

As shown in FIG. 2A which is the schematic view, in general, when light impinges on a scattering element, the light scatters. Various elements can be used as the scattering element. The true spherical particle (the particle 211 having a spherical shape) also forms the scattering element.

In the embodiment 1, a true spherical particle having a size larger than a wavelength of visible light is used as the scattering element. Accordingly, in the scattering of light using such a scattering element (true spherical particle), Mie scattering is superior to Rayleigh scattering.

In general, it is known that scattered light intensity changes corresponding to a scattering angle in Mie scattering.

In this specification, a graphic representation state where the relationship between a scattering angle and scattered light intensity is expressed as distribution is referred to as distribution of scattered light intensities corresponding to scattering angles (hereinafter simply referred to as "scattered light intensity distribution").

(7) Scattered Light Intensity Distribution for Respective Wavelengths

FIG. 2B is a graph expressing the distribution of scattered light intensities corresponding to scattering angles (scattered light intensity distribution) when light impinges on a single true spherical particle having a predetermined particle size (6.8 μm in this embodiment) and the light scatters. This graph is also a graph equivalent to a graph where a portion of a so-called "radiation intensity pattern", where intensity of scattered light with respect to incident light is plotted over 360° or 180°, is expressed orthogonally. A scattering angle, when the direction equal to the direction along which light impinges on the true spherical particle (particle 211) (the advancing direction of the incident light) is defined as 0°, is taken on an axis of abscissas in the graph. The relative intensities of the scattered light in the respective angles when the intensity of the scattered light at the scattering angle of 0° is assumed as 1 are taken on an axis of ordinates in the graph. In reality, the scattered light includes various wavelengths (colors). However, in this graph, as representative examples, scattered light intensity distributions with respect to three wavelengths of 633 nm (red), 546 nm (green), and 486 nm (blue) are illustrated in a superposing manner.

The distribution of the scattered light intensity (scattered light intensity distribution) corresponding to scattering angles changes corresponding to wavelengths (colors) of light.

As shown in FIG. 2B, for example, the scattered light intensity distribution of 633 nm (red), the scattered light intensity distribution of 546 nm (green), and the scattered light intensity distribution of 486 nm (blue) depict curves which differ from each other (wavelength dependency of scattered light intensity).

It is not the case that so long as the scattering angle is equal, scattered light intensities of respective wavelengths (colors) are equal. Even when the scattering angle is equal, scattered light intensities are different depending on wavelengths (colors) (excluding angles where graphs intersect with each other).

The wavelength (color) having the strong scattered light intensity at the scattering angle relatively suppresses the wavelength (color) having the weak scattered light intensity. As a result, the wavelength (color) having the strong scattered light intensity is emphasized (separation of colors). As the scattering angle changes, the wavelength having the relatively strong (superior) scattered light intensity is sequentially exchanged. As a result, as the scattering angle changes, the color which is emphasized also shifted (iris phenomenon).

According to an example shown in FIG. 2B, "scattered light intensity distribution for respective wavelengths" appears in such a manner that 633 nm (red) is superior from the scattering angle of 0° to approximately 4°, and thereafter, each time the angle is increased by approximately 1°, 486 nm (blue), 546 nm (green), and 633 nm (red) become superior sequentially by turns.

FIG. 2C is a view which expresses, by simulation, an image which is viewed in a plane perpendicular to the advancing direction on an incident light (a plane on a side opposite to a side on which the incident light impinges with the particle 211 sandwiched between the incident light impinging side and the plane) when the incident light impinges on a single true spherical particle having a predetermined particle size (6.8 μm in this embodiment) and scatters.

FIG. 2C is a monochromic image and hence, it is difficult to confirm such an image. However, in a color image which is an original of the image shown in FIG. 2C, an iris phenomenon can be clearly confirmed where the color which becomes superior is sequentially exchanged, such as, in order of red, blue, green, red . . . as the scattering angle changes.

(8) Difference in Manner of Appearance of "Scattered Light Intensities for Respective Wavelengths" Corresponding to Particle Sizes In this embodiment, it is confirmed that, when sizes of particles having a spherical shape differ (that is, kinds of the scattering elements differ), the manner of appearance of the "scattered light intensities for respective wavelengths" differ corresponding to the difference in sizes of particles having a spherical shape.

Figure 3A:
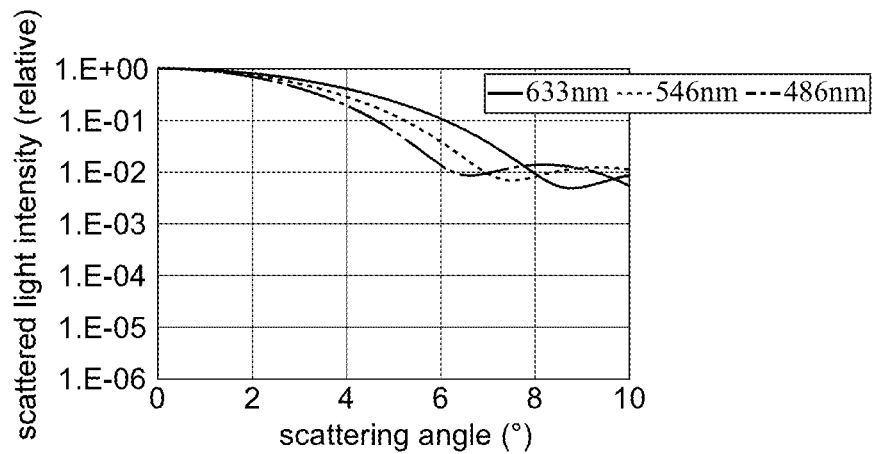
FIG. 3A, FIG. 3B and FIG. 3C are views for describing that the manner of appearance of "scattered light intensity for respective wavelengths" differs depending on a size of a particle having a spherical shape.
Figure 3B:
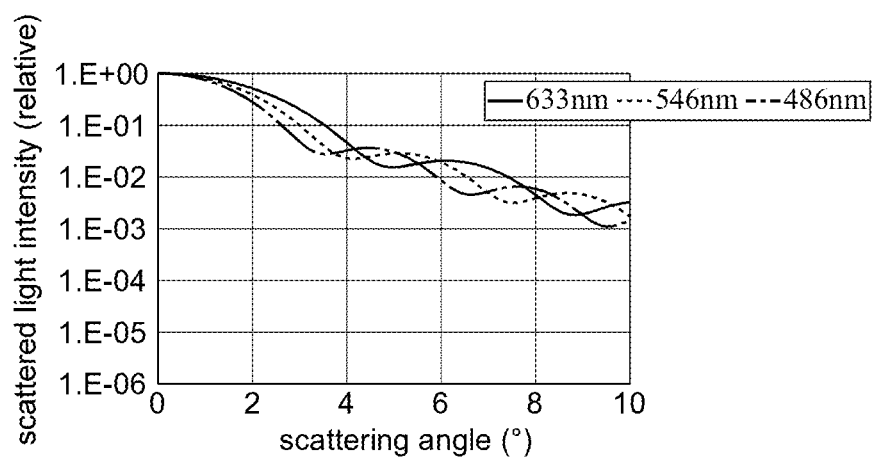
Figure 3C:
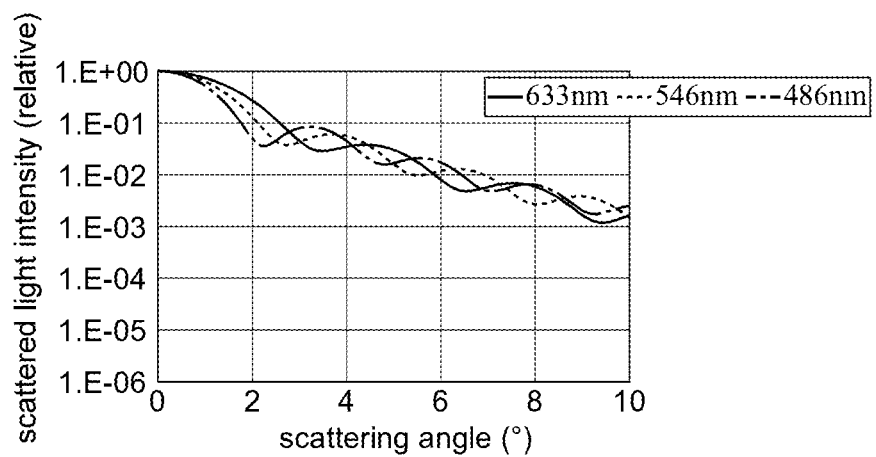

FIG. 3A, FIG. 3B and FIG. 3C are views for describing that the manner of appearance of "scattered light intensities for respective wavelengths" differ corresponding to sizes of particles having a spherical shape. FIG. 3A to FIG. 3C respectively correspond to FIG. 2B and hence, the description of the detail of the meaning which the graph indicates, the axis of abscissas, the axis of ordinates and the like used with respect to FIG. 2A are also applicable to FIG. 3A to FIG. 3C.

FIG. 3A is a graph expressing "scattered light intensity distribution" when a single true spherical particle having a particle size 4 μm (assumed as a first scattering element) is mixed into the base material 100. In the same manner, FIG. 3B is a graph expressing "scattered light intensity distribution" when a single true spherical particle having a particle size 7 μm (assumed as a second scattering element) is mixed into the base material 100. FIG. 3C is a graph expressing "scattered light intensity distribution" when a single true spherical particle having a particle size 9 μm (assumed as a third scattering element) is mixed into the base material 100.

Regarding the first scattering element, as shown in FIG. 3A, the scattered light intensity distribution (a first pattern) appears in such a manner that 633 nm (red) becomes superior from a scattering angle of 0° to approximately 7°, and 486 nm (blue) and 546 nm (green) become superior in this order in the scattering angle exceeding 7°.

Regarding the second scattering element, as shown in FIG. 3B, the scattered light intensity distribution (a second pattern) appears in such a manner that 633 nm (red) becomes superior from a scattering angle of 0° to approximately 4°, and 486 nm (blue), 546 nm (green), and 623 nm (red) become superior sequentially by turns in the scattering angle exceeding 4° each time the scattering angle is increased by approximately 1°.

Regarding the third scattering element, as shown in FIG. 3C, the scattered light intensity distribution (a third pattern) appears in such a manner that 633 nm (red) becomes superior from a scattering angle of 0° to approximately 3°, and 486 nm (blue), 546 nm (green), and 633 nm (red) become superior sequentially by turns in a scattering angle exceeding 3° each time the scattering angle is increased by approximately 0.7°.

In this manner, it is confirmed that, even among the particles having the same spherical shape (true spherical particles), the scattered light intensity distribution (the pattern) appears differently corresponding to the difference in the size of the particle.

Based on such finding, the optical filter 1 according to the embodiment 1 is configured as follows.

(9) "Group of True Spherical Particles Having Different Sizes" which Form Scattering Elements In the optical filter 1 according to the embodiment 1, a plurality of light scattering particles 200A include a plurality of scattering elements 210A where the manner of appearance of "scattered light intensity distribution for respective wavelengths" differ from each other.

As described above, the first true spherical particles 211a (first scattering elements) having a size of d1, the second true spherical particles 211b (second scattering elements) having a size of d2, and the third true spherical particles 211c (third scattering elements) having a size of d3 . . . differ from each other with respect to the manner of appearance of scattered light intensity distribution for respective wavelengths. In other words, these true spherical particles 211a, 211b, 211c . . . have different scattering characteristics from each other. That is, in the embodiment 1, the first true spherical particles 211a (first scattering elements), the second true spherical particles 211b (second scattering elements), the third true spherical particles 211c (third scattering elements) . . . are defined as separate scattering elements which have characteristics different from each other.

Accordingly, in the embodiment 1, "a plurality of scattering elements 210A which differ from each other in the manner of appearance of scattered light intensity distribution for respective wavelengths" are formed of the plurality of particles 211 (211a, 211b, 211c . . . ) having a spherical shape which differ in size from each other (a group of true spherical particles having different sizes).

2. Manner of Operation and Advantageous Effects of Optical Filter 1 According to Embodiment 1

(1) Blending of Scattering Elements Having Different Characteristics from Each Other The optical filter 1 according to the embodiment 1 includes the base material 100 and the plurality of light scattering particles 200A mixed into the base material 100. The plurality of light scattering particles 200A have a plurality of scattering elements 210A (211a, 211b, 211c . . . ) which differ from each other in the manner of appearance of "scattered light intensity distribution for respective wavelengths".

Accordingly, by suitably blending the scattering elements which differ from each other in manner of appearance of "scattered light intensity distribution for respective wavelengths" (in other words, scattering elements having different scattering characteristic), strength patterns of scattered light intensities which differ from each other corresponding to wavelengths (scattered light intensity distributions for respective wavelengths) are made uniform because the strength patterns offset each other. As a result, as a whole, it is possible to eliminate the dependency of the scattered light intensity distribution on wavelengths (elimination of dependency of the scattered light intensity distribution on wavelengths by offsetting).

Figure 4:
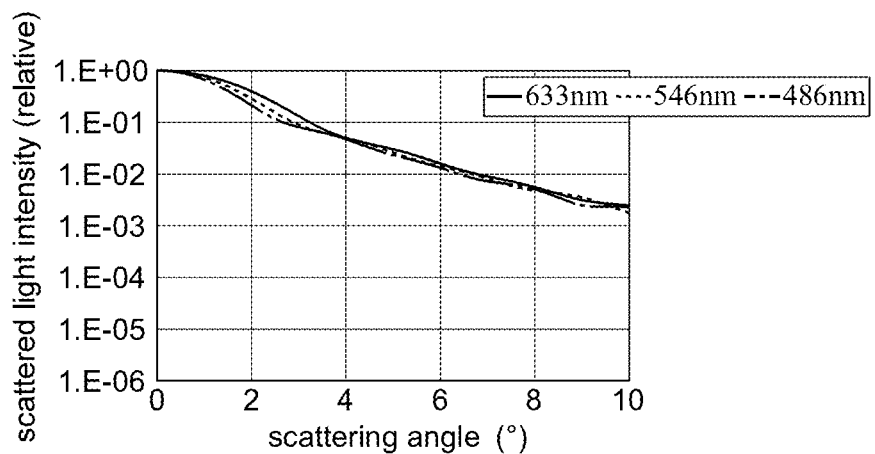
FIG. 4 is view for describing an example where dependency on wavelengths in scattered light intensity distribution is eliminated.

FIG. 4 is a view for describing an example where dependency on wavelengths in scattered light intensity distribution is eliminated. FIG. 4 corresponds to FIG. 2B and hence, the description of the detail of the meaning which the graph indicates, the axis of abscissas, the axis of ordinates and the like used with respect to FIG. 2A are also applicable to FIG. 4. FIG. 4 is the graph expressing "scattered light intensity distribution" when true spherical particles (light scattering particles 200A/scattering elements 210A) respectively having 3 μm, 4 μm, 5 μm, 6 μm, 7 μm, 8 μm, 9 μm as particle sizes are blended at equal amounts, and a group of blended true spherical particles is mixed into the base material 100.

As shown in FIG. 4, to superpose scattered light intensity distributions of three wavelengths at 633 nm (red), 546 nm (green), and 486 nm (blue) to each other, even at any scattering angle between 0° to 10°, a state where only a specific wavelength (specific color) is superior to other wavelengths (colors) is not observed but a state where scattered light intensities of three wavelengths are substantially at the same level is observed and hence dependency on wavelengths in the scattered light intensity distribution is eliminated. That is, as described above, by mixing (blending) the plurality of scattering elements 210A (211a, 211b, 211c . . . ) which differ from each other in manner of appearance of "scattered light intensity distribution for respective wavelengths" to the base material, the occurrence of an iris phenomenon can be suppressed as a result. By suppressing the occurrence of such an iris phenomenon, blurring of color caused by aberration which appear on an outline of a focused image can also be suppressed.

The optical filter 1 according to the embodiment 1 is configured to scatter incident light by the plurality of light scattering particles 200A (forming a part of the scattering elements) mixed into the base material 100, and to irradiate the scattered light to the outside of the optical filter 1. In other words, the optical filter 1 according to the embodiment 1 can exhibit a soft focusing effect without adopting a technique where a surface of the filter is roughened or unevenness is formed on a surface of the filter (a method of roughening the surface).

As described above, according to the embodiment 1, it is possible to provide the optical filter, without adopting a method of roughening the surface of the optical filter, for soft focusing which can suppress the occurrence of an iris phenomenon.

(2) Particles Having Spherical Shape

In the optical filter 1 according to the embodiment 1, each of the plurality of light scattering particles 200A is formed of the plurality of particles 211 having a spherical shape which differ in sizes from each other. Specifically, each of the plurality of light scattering particles 200A is formed of true spherical particles having different sizes.

In general, the light scattering particles having a spherical shape can be easily manufactured and acquired and hence, by adopting such light scattering particles, the advantageous effects of the optical filter 1 according to the embodiment 1 can be acquired relatively easily.

(3) Blending Ratio of Particles Having a Spherical Shape (Particle Size Distribution)

As described above, in the optical filter 1 corresponding to FIG. 1A and FIG. 1B, "the plurality of light scattering particles 200A" are formed by blending the true spherical particles (scattering elements 210A) having particle sizes of 3 μm, 4 μm, 5 μm, 6 μm, 7 μm, 8 μm, and 9 μm respectively at the same amounts. That is, the true spherical particles are selected that the sizes of the true spherical particles are changed from 3 μm to 9 μm at an equal interval, and these true spherical particles are blended at the same amount.

However, such a blending ratio (particle size distribution) is not limited to such a ratio. Depending on an intended use, true spherical particles having different sizes from each other may be blended at a suitable blending ratio.

(3-1) In the optical filter 1 according to the embodiment 1, assuming an average particle size of the particle 211 having a spherical shape contained in the optical filter 1 as Φ, and a total number of the particles having a spherical shape as Ns, it is preferable that the number of particles having an average particle size which falls within a range of 0.4Φ to 0.6Φ and contained in the optical filter 1 be 0.1 Ns pieces or more, and the number of particles having an average particle size which falls within a range of 1.3Φ to 1.8Φ and contained in the optical filter 1 be 0.1 Ns pieces or more. In other words, it is preferable that the optical filter 1 contain 10% or more of particles having average particle sizes which fall within a range of 40% to 60% of the average particle size Φ with respect to a total amount of the particles contained in the optical filter 1, and contains 10% or more of particles having average particle sizes which fall within a range of 130% to 180% of the average particle size Φ with respect to the total amount of the particles contained in the optical filter 1.

In this embodiment 1, "the average particle size" is an average particle size measured by a Coulter method (electrical detection band method) which uses a so-called Coulter principle. In the description made hereinafter, "average particle size" may also be simply referred to as "average particle size".

In a case where an amount of particles having an average particle size which falls within a range of from 0.4Φ to 0.6Φ (particles having sizes smaller than an average) is smaller than 10% or in a case where an amount of particles having an average particle size which falls within a range of from 1.3Φ to 1.8Φ (particles having sizes larger than the average) is smaller than 10%, the optical filter becomes an optical filter close to the optical filter of the comparative example where light scattering particles having only a single particle size are mixed. Accordingly, the above-mentioned effect with respect to elimination of wavelength dependency of scattered light intensity distribution acquired by offsetting is decreased and hence, there may be a case where an iris phenomenon cannot be sufficiently suppressed.

In view of the above, the optical filter 1 contains 0.1 Ns pieces or more of particles having an average particle size which falls within a range of from 0.4Φ to 0.6Φ, and 0.1 Ns pieces or more of particles having an average particle size which falls within a range of from 1.3Φ to 1.8Φ. Accordingly, the optical filter 1 can sufficiently acquire an effect with respect to the elimination of wavelength dependency of scattered light intensity distribution acquired by the above-mentioned offsetting.

(3-2) It is more preferable that the optical filter 1 according to the embodiment 1 contain 0.5 Ns pieces or more of particles having an average particle size which falls within a range of from 0.9Φ to 1.1Φ. In other words, it is more preferable that the optical filter 1 according to the embodiment 1 contain 50% or more of particles having an average particle size which falls within a range of ±10% of Φ with respect to the total amount of particles.

According to Mie scattering theory, in general, when an average particle size of a scattering element becomes excessively large, there may be a case where rear scattering becomes strong thus giving rise to a possibility that a loss occurs in light from an object-to-be-imaged side so that a dark image or photograph is acquired. Further, when an average particle size of scattering element becomes excessively large, dependency of scattered light intensity distribution on wavelengths becomes small. Accordingly, particles having an average particle size close to Φ (±10%) with respect to Φ exhibit strong dependency of scattered light intensity distribution with respect to a wavelength and hence, it may be safe to say that a strength pattern of scattering light intensity easily appears and hence, there may be a case where such a situation is suitable for offsetting to the contrary. Accordingly, by allowing the optical filter 1 contain a large amount of particles having an average particle size close to Φ (±10%) with respect to Φ, the elimination of wavelength dependency of the scattered light intensity distribution by offsetting can be efficiently performed without excessively mixing the light scattering particles and hence, an iris phenomenon can be suppressed.

(3-3) Further, in the optical filter 1 according to the embodiment 1, it is more preferable that a plurality of particles having a spherical shape which are mixed into the base material 100 are different by at least 8 μm or more in a particle size.

In a case where particle sizes of mixed particles having a spherical shape are shifted only to a range close to the average particle size Φ, the above-mentioned effect with respect to the elimination of wavelength dependency of the scattered light intensity distribution by offsetting can be decreased and hence, there may be a case where an iris phenomenon cannot be sufficiently suppressed.

Accordingly, by mixing a plurality of particles having spherical shape in a state where the difference of at least 8 μm or more exists in the particle size, an effect with respect to the elimination of wavelength dependency of the scattered light intensity distribution by offsetting can be sufficiently acquired and hence, an iris phenomenon can be suppressed.

(4) Density of Light Scattering Particles 200A (Particles 211 Having a Spherical Shape/Scattering Elements 210A)

The description has been made that the scattered light intensity distribution for respective wavelengths are made uniform by offsetting for respective wavelengths by blending the scattering elements having different scattering characteristics. From such understanding, it may be considered that the larger the number of kinds of the scattering elements to be blended and the larger an amount of particles 211 having a spherical shape (scattering elements 210A) mixed into the base material 100, the more the distribution becomes uniform and hence, a favorable optical filter which suppresses the occurrence of an iris phenomenon can be acquired.

However, when a mixing amount of the particles 211 having a spherical shape is excessively large, light scattering occurs excessively in the optical filter 1. As a result, the whole screen of a video or a photograph becomes whitish and hence, practicability of the optical filer 1 as an optical filter for soft focusing is lowered. In view of the above, it is necessary to set a mixing amount of the particles 211 having a spherical shape mixed into the base material 100 within an appropriate range.

(4-1) Assuming a plate thickness of the base material 100 as t, an average free step with respect to a d line as Md, and an angle at which the light scattering intensity becomes 50% or less with respect to the light intensity at incidence with single scattering with respect to the d line as θ (all such values not shown in the drawing), it is preferable that the particles 211 having a spherical shape be mixed into the base material 100 in accordance with the following (formula 1).

$$0<(\theta \times t/Md)\leq 2 \quad \text{(formula 1)}$$

That is, a mixing amount of the particles having a spherical shape is set such that the mixing density of the particle 211 having a spherical shape with respect to the base material 100 satisfies (formula 1).

The case, where (θ×t/Md) is 0 (zero) in formula 1, is substantially equal to a case where there is substantially no light scattering in the optical filter 1 and hence, the optical filter 1 cannot acquire a soft focusing effect. On the other hand, when (θ×t/Md) exceeds 2, light scattering becomes strong and hence, a soft focusing effect (blurring) becomes excessive. As a result, a resolution of a video or a photograph is largely lowered.

Accordingly, by setting a mixing amount of the particles 211 having a spherical shape such that (θ×t/Md) falls within a range of from 0 (zero) to 2, an appropriate soft focusing effect can be acquired.

(4-2) It is preferable that the particles 211 having a spherical shape be mixed into the base material 100 in accordance with the following (formula 2).

$$0.1\leq(\theta \times t/Md)\leq 1.5 \quad \text{(formula 2)}$$

By setting a mixing amount of the particles 211 having a spherical shape in accordance with the (formula 2), a favorable soft focusing effect can be acquired. Further, a favorable balance between resolution and a soft focusing effect can be acquired.

(4-3) It is further preferable that the particles 211 having a spherical shape be mixed into the base material 100 in accordance with the following (formula 3).

$$0.2\leq(\theta \times t/Md)\leq 1.0 \quad \text{(formula 3)}$$

By setting a mixing amount of the particles 211 having a spherical shape in accordance with the (formula 3), a further favorable soft focusing effect can be acquired. A further favorable balance between resolution and a soft focusing effect can be also acquired.

(5) Refractive Indexes of Base Material 100 and Light Scattering Particle 200A

It is preferable that a difference between a refractive index of the base material 100 and a refractive index of the light scattering particle 200A be approximately 0.05.

When the difference between these refractive indexes is far smaller than 0.05, light scattering minimally occurs and hence, a sufficient soft focusing effect cannot be acquired. When the difference between these refractive indexes is far larger than 0.05, light scattering is liable to excessively occur and hence, depending on a circumstance, rear scattering becomes superior. Accordingly, an amount of light which reaches an imaging plane becomes small and hence, it is difficult to use the optical filter as an optical filter for soft focusing.

In view of the above, by setting the difference between the refractive index of the base material 100 and the refractive index of the light scattering particle 200A to approximately 0.05, appropriate light scattering can be generated and hence, a soft focusing effect which a user likes can be acquired.

Embodiment 2

1. Configuration of Optical Filter 2 According to Embodiment 2

Figure 5:
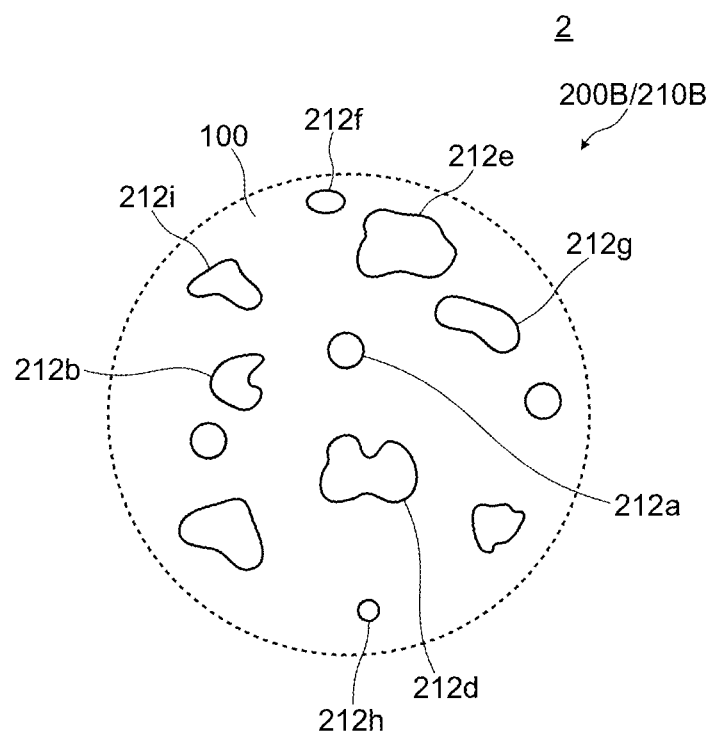
FIG. 5 is a view for describing an optical filter 2 according to an embodiment 2.

FIG. 5 is a view for describing an optical filter 2 according to the embodiment 2. FIG. 5 is a view corresponding to FIG. 1B provided for describing the optical filter 1 according to the embodiment 1, and is an enlarged cross-sectional view of a main part in a state where a portion surrounded by a broken line A in FIG. 1A is enlarged. In FIG. 5, constitutional elements identical with corresponding constitutional elements in the embodiment 1 are given the same symbols used in the embodiment 1. Accordingly, the constitutional elements identical with the corresponding constitutional elements in the embodiment 1 are given the same symbols used in the embodiment 1, and with respect to the detailed description of these constitutional elements, the description in the embodiment 1 is used (applicable by analogy).

The optical filer 2 according to the embodiment 2 has basically substantially the same configuration as the optical filter 1 according to the embodiment 1. However, the optical filer 2 according to the embodiment 2 differs from the optical filter 1 according to the embodiment 1 with respect to a state of the light scattering particles (eventually a state of a scattering element).

That is, in the optical filter 2 according to the embodiment 2, as shown in FIG. 5, each of a plurality of light scattering particles 200B is formed of a plurality of particles 212 (212a, 212b, 212c, 212d, 212e, 212f, 212g, 212h, 212i . . . ) which have different shapes from each other.

FIG. 5 schematically depicts one example of the plurality of light scattering particles 200B. Sizes and shapes of the respective particles are different from each other (particles having any irregular shapes), and the respective particles are also disposed in the base materials 100 in random pastures.

Figure 6A:
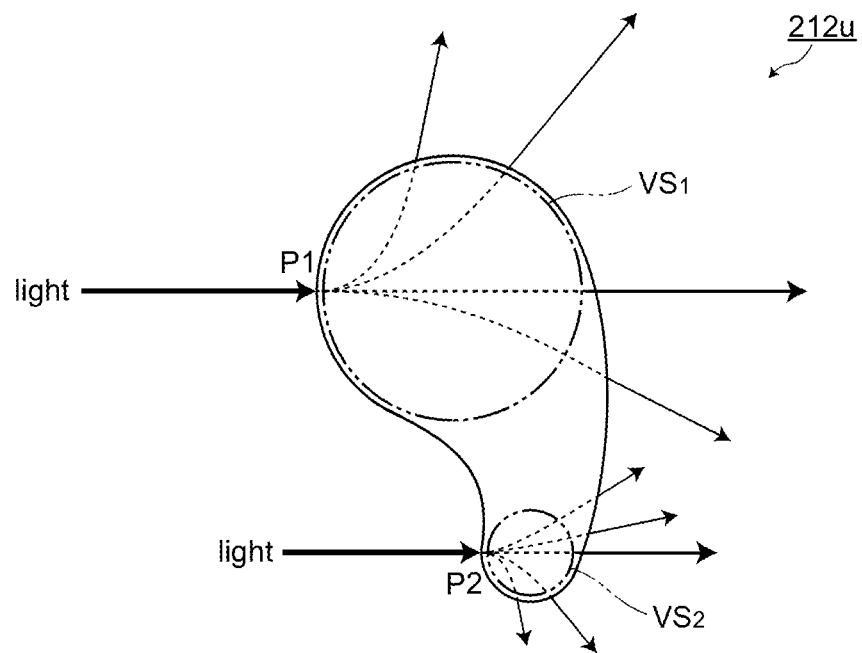
FIG. 6A and FIG. 6B are views for describing the manner of operation and advantageous effects of the optical filter 2 according to the embodiment 2.
Figure 6B:
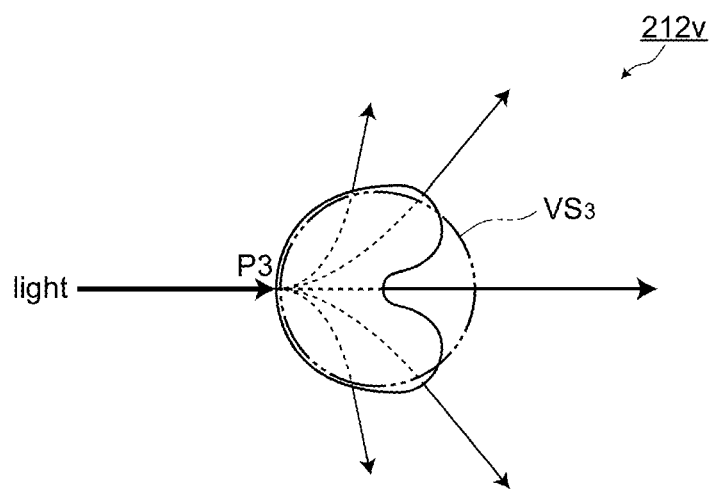

FIG. 6A and FIG. 6B are views for describing the manner of operation and advantageous effects of the optical filer according to the embodiment 2. FIG. 6A is a view schematically showing a state of light scattering when light impinges on the relatively large particle 212u having any irregular shape. FIG. 6B is a view schematically showing a state of light scattering when light impinges on a particle 212v having an intermediate size and any irregular shape.

With respect to the description of the arrows in FIG. 6A and FIG. 6B, the description in FIG. 2A is used.

When observed respective portions which form an outline of the particle having any irregular shape microscopically, the respective portions have various radii of curvature. For example, the portion of the particle in the vicinity of a first point P1 on which light impinges has a relatively large radius of curvature, and the portion of the particle in the vicinity of a second point P2 on which another light impinges has a relatively small radius of curvature (see FIG. 6A). The portion in the vicinity of a third point P3 on which further another light impinges has a radius of curvature of an intermediate size (see FIG. 6B).

When the light impinges on the first point P1, the second point P2, and the third point P3, since the radius of curvature at the first point P1, the radius of curvature at the second point P2, and the radius of curvature at the third point P3 differ from each other. Accordingly, as viewed locally, it is considered that same effect is acquired as the case where light scatters by impinging on imaginary true spherical particles VS1, VS2, VS3 which have different sizes from each other.

That is, the portion in the vicinity of the first point P1 having the relatively large radius of curvature forms a "first scattering element" which corresponds to the imaginary true spherical particle VS1, the portion in the vicinity of second point P2 which has the relatively small radius of curvature forms a "second scattering element" which corresponds to the imaginary true spherical particle VS2, and the portion in the vicinity of the third point P3 which has a radius of curvature of an intermediate size forms a "third scattering element" which corresponds to the imaginary true spherical particle VS3.

Accordingly, when the optical filter is observed as a whole, the optical filter is equivalent to an optical filter where imaginary true spherical particles having various sizes are distributed at random.

The respective points and the scattering elements corresponding to the respective points are exemplified for description, and the optical filer is not limited to them.

For reference, respective portions having different shapes from each other (respective portions having different radii of curvature from each other) in one particle form "plurality of scattering elements having different manners of appearance of scattered light intensity distribution for respective wavelengths".

Further, when the shape of the whole particle differs, the manner of appearance of the "scattered light intensity distribution for respective wavelengths" naturally differs. Accordingly, in the embodiment 2, "the plurality of particles 212 having different shapes from each other" also form "the plurality of scattering elements having the different manner of appearance of scattered light intensity distribution for respective wavelengths from each other".

Further, also with respect to one same particle, the manner of appearance of scattered light intensity distribution differs depending on the posture of the particle or the direction along which light is incident of the particle. Accordingly, in the embodiment 2, the particles which differ from each other in the posture of the particle in the base material 100 also forms "the plurality of scattering elements which differ in the manner of appearance of scattered light intensity distribution for respective wavelengths from each other".

2. Advantageous Effects of Optical Filter 2 According to Embodiment 2

The optical filter 1 according to the embodiment 1 is an optical filter which uses true spherical particles (particles 211 having a spherical shape). Accordingly, to suppress the occurrence of an iris phenomenon regardless of a portion of the optical filter, it is necessary to mix the particles into the base material 100 such that the particles are uniformly distributed in the base material 100 for each type of particles having the same size. That is, it is necessary to perform a distribution control in the base material 100 for respective particles having respective sizes.

On the other hand, in the optical filter 2 according to the embodiment 2, a plurality of light scattering particles 200B are formed of a plurality of particles having different shapes from each other. As described above, the plurality of light scattering particles 200B have various sizes and shapes (particles having any irregular shape), and postures of the particles are also at random.

Accordingly, it is possible to acquire advantageous effects substantially equal to advantageous effects acquired by the configuration where the imaginary true spherical particles having different sizes exist.

In this manner, according to the optical filter 2 of the embodiment 2, it is sufficient to mix the particles having any irregular shape into the base material 100 while taking into account the distribution irregularities of the particles having irregular shape.

Accordingly, it is unnecessary to perform a distribution control in the base material 100 for respective particles having respective sizes unlike the optical filter according to the embodiment 1 and hence, the optical filter can be acquired relatively easily.

Further, the particles having any irregular shape according to the embodiment 2 can acquire an advantageous effect substantially equal to an advantageous effect acquired by the configuration where the imaginary true spherical particles having various sizes are provided everywhere. Accordingly, in the optical filter 2 according to the embodiment 2, unlike the embodiment 1, it is unnecessary to mix the large number of particles having a spherical shape and having different sizes for eliminating wavelength dependency of scattered light intensity distribution caused by offsetting. As a result, there is no possibility that the density of light scattering particles is high so that the whole screen become whitish and hence, a favorable soft focusing effect can be acquired.

The optical filter 2 according to the embodiment 2 has basically substantially the same configuration as the optical filter 1 according to the embodiment 1 with respect to the configuration other than a state of the light scattering particles (eventually, a state of scattering elements). Accordingly, the optical filter 2 according to the embodiment 2 acquires corresponding advantageous effects found amongst all advantageous effects which the optical filter 1 according to the embodiment 1 acquires.

Embodiment 3

Figure 7A:
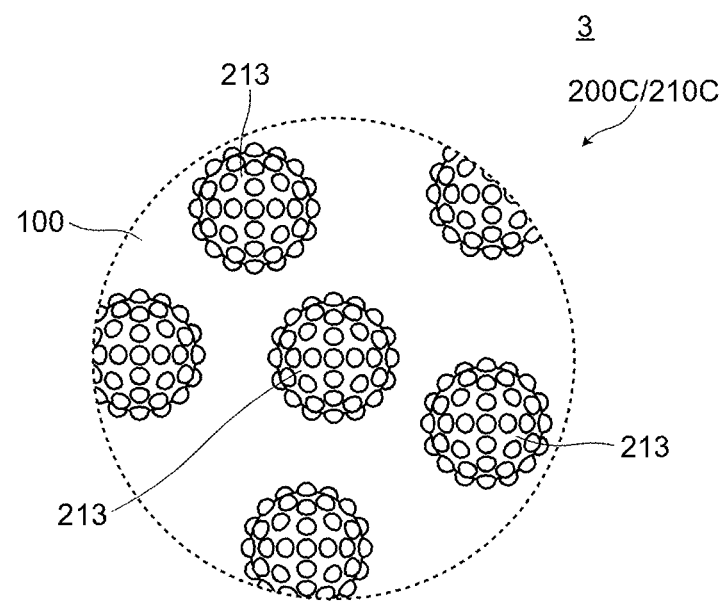
FIG. 7A and FIG. 7B are views for describing an optical filter 3 according to an embodiment 3.
Figure 7B:
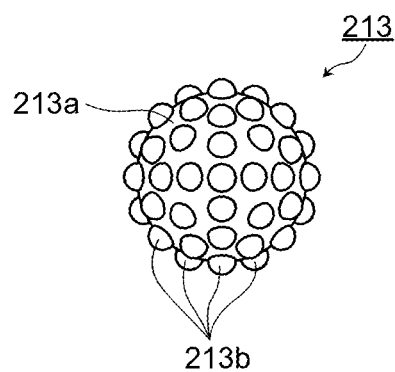

FIG. 7A and FIG. 7B are views for describing an optical filter 3 according to the embodiment 3. FIG. 7A is a view corresponding to FIG. 1B which describes the optical filter 1 according to the embodiment 1, and is also an enlarged cross-sectional view of a main part where a portion surrounded by a broken line A in FIG. 1A is enlarged. FIG. 7B is an enlarged perspective view of a particle 213 having konpeito (Japanese rock candy) shape contained in the optical filter 3. In FIG. 7A and FIG. 7B, constitutional elements identical with the corresponding constitutional elements in the embodiment 1 are given the same symbols used in the embodiment 1, and with respect to the detailed description of these constitutional elements, the description in the embodiment 1 is used.

The optical filter 3 according to the embodiment 3 has basically substantially the same configuration as the optical filter 1 according to the embodiment 1 and the optical filter 2 according to the embodiment 2. However, the optical filter 3 according to the embodiment 3 differs from the optical filter 1 according to the embodiment 1 and the optical filter 2 according to the embodiment 2 with respect to a state of light scattering particles (eventually, a state of scattering elements).

That is, in the optical filter 3 according to the embodiment 3, as shown in FIG. 7A, each of a plurality of light scattering particles 200C is formed of a particle 213 having a konpeito (Japanese rock candy) shape where a plurality of small protruding portions 213b are formed on a surface of a spherical particle.

As shown in FIG. 7B, the particle 213 having a konpeito shape includes a large spherical portion 213a and small protruding portions 213b. It is preferable that sizes of the large spherical portions 213a of a plurality of spherical konpeito shaped particles 213 be substantially equal to each other.

Figure 8:
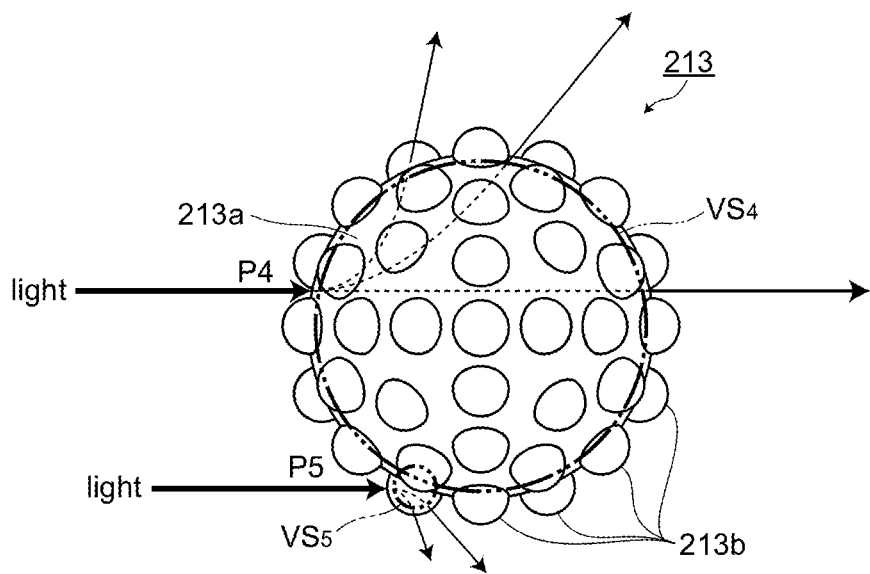
FIG. 8 is a view for describing the manner of operation and advantageous effects of the optical filter 3 according to the embodiment 3.

FIG. 8 is a view for describing the manner of operation and advantageous effects of the optical filter 3 according to the embodiment 3. Specifically, FIG. 8 is a view schematically showing a state of scattering of light when the light impinges on the particle 213 having a konpeito (Japanese rock candy) shape included in the optical filter 3. With respect to the description of arrows, the description of the arrows in FIG. 2A is used.

The concept about scattering of light with respect to the particle 213 having a konpeito shape is basically equal to the concept of scattering of light with respect to the particle having any irregular shape in the embodiment 2.

When observed respective portions which form an outline of the particle 213 having a konpeito shape microscopically, the respective portions have various radii of curvatures. For example, a portion in the vicinity of a fourth point P4 (a portion of large spherical portion 213a) on which light impinges has a relatively large radius of curvature, and a portion in the vicinity of a fifth point P5 (a portion of the small protruding portion 213b) on which another light impinges has a relatively small radius of curvature (see FIG. 8).

When light impinges on the fourth point P4 and the fifth point P5, the radii of curvatures of the points P4, P5 differ from each other and hence, as viewed locally, it is considered that substantially the same effect is acquired as the case where the light impinges on imaginary true spherical particles VS4, VS5 having different sizes from each other and scatters.

That is, the portion in the vicinity of the fourth point P4 having a relatively large radius of curvature forms a "fourth scattering element" which corresponds to the imaginary true spherical particle VS4, and the portion in the vicinity of the fifth point P5 which has a relatively small radius of curvature forms "a fifth scattering element" which corresponds to the imaginary true spherical particle VS5.

Accordingly, when the optical filter is observed as a whole, the optical filter is equivalent to an optical filter where imaginary true spherical particles having different sizes are distributed at random.

The respective points and the scattering elements corresponding to the respective points are illustrated for the purpose of description, and the present invention is not limited to them.

For reference, "a particle 213 having a konpeito shape which includes a plurality of small protruding portions 213b on a surface of a spherical particle" forms "a plurality of scattering elements having the different manner of appearance of scattered light intensity distribution for respective wavelengths".

In this embodiment, the large spherical portion 213a of a spherical particle forms one scattering element, and the large number of respective small protruding portions 213b attached to the surface of the spherical particle also form different scattering elements respectively.

The large spherical portion 213a and the small protruding portions 213b may not have a spherical shape. For example, the large spherical portion 213a may have polygonal shape, and the small protruding portions 213b may have a circular cone shape or any irregular shape. The respective diameters (sizes) of the large spherical portion 213a and the small protruding portions 213b may be uneven. Further, recessed portions may be formed on the surface of the large spherical portion 213a in addition to the small protruding portions 213b or by replacing the small protruding portions 213b.

The optical filter 3 according to the embodiment 3 has basically substantially the same configuration as the optical filter 1 according to the embodiment 1 and the optical filter 2 according to the embodiment 2 with respect to the configuration other than the state of the light scattering particles (eventually, the state of the scattering elements). Accordingly, the optical filter 3 according to the embodiment 3 acquires the corresponding advantageous effects found amongst all advantageous effects which the optical filters 1, 2 according to the embodiments 1, 2 acquire.

Embodiment 4

Figure 9:
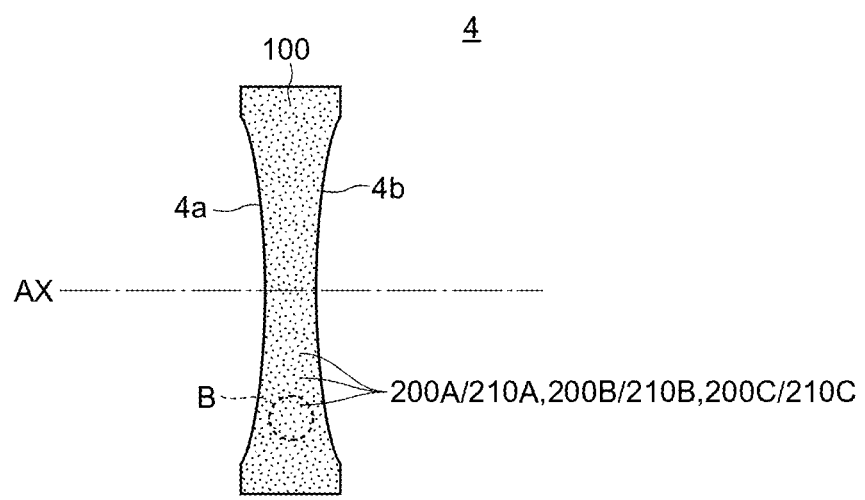
FIG. 9 is a view for describing an optical filter 4 according to an embodiment 4.

FIG. 9 is a view for describing an optical filter 4 according to the embodiment 4. FIG. 9 is a view corresponding to FIG. 1A which describes the optical filters 1, 2 and 3 according to the embodiments 1 to 3. Accordingly, the same symbols are given to constitutional elements identical with the corresponding constitutional elements in the embodiment 1, and the description in the embodiment 1 is used as the detailed description of these constitutional elements.

The optical filter 4 according to the embodiment 4 has basically substantially has the same configuration as the optical filters 1, 2 and 3 according to the embodiments 1 to 3. However, the optical filter 4 according to the embodiment 4 differs from the optical filters 1, 2 and 3 according to the embodiments 1 to 3 with respect to the power which each optical filter has as a lens.

The optical filters 1, 2 and 3 according to the embodiments 1 to 3 have "a flat plate shape" where each of the optical filters 1, 2 and 3 includes a first main surface 1a and the second main surface 1b having an approximately parallel relationship with each other. Accordingly, the powers of lens are substantially 0 (zero)(see FIG. 1A).

On the other hand, as shown in FIG. 9, the optical filter 4 according to the embodiment 4 has a shape where a first main surface 4a and a second main surface 4b are inwardly recessed. As a result, a thickness of the optical filter 4 in a region close to a periphery which is remote from an optical axis AX is larger than a thickness of the optical filter 4 at a position in the vicinity of the optical axis AX. That is, the optical filter 4 also has a function as a concave lens (a negative lens) while having a function as an optical filter. That is, the optical filter 4 also has the negative power as a lens.

In the optical filter 4 having such a configuration, the remoter a region extends from the center (optical axis AX) toward the periphery, the larger a plate thickness of the region becomes. Accordingly, the remoter a region, from the optical axis AX, where a light passes through the optical filter 4, the longer an optical path length of the light becomes. Accordingly, the probability that the light impinges on the light scattering particle (any one of light scattering particles 200A, 200B, 200C, affixing of symbols being omitted in the description of the succeeding embodiments) and scatters is increased. That is, the light in the periphery region which is remote from the optical axis AX can be more positively scattered. Accordingly, in addition to the acquisition of a soft focusing effect while suppressing the occurrence of an iris phenomenon in the same manner as the optical filters 1, 2 and 3 according to the embodiments 1 to 3, it is possible to acquire image focusing in a state where the closer the periphery from the center of the optical filter, the larger a degree of soft focusing (blurring) becomes.

The shape of the optical filter 4 according to the embodiment 4 is a shape of a biconcave negative lens. The shape of the optical filter 4 according to the embodiment 4 may be a negative lens shape where one of a light incident surface and a light irradiation surface is formed of a flat plane, and the other is formed of a concave surface. Further, the shape of the optical filter 4 may be a meniscus lens shape having negative power. In this case, the optical filter 4 may be formed in a convex shape on either a light incident side or a light irradiation side.

The optical filter 4 may be formed into a positive lens shape although such an optical filter 4 cannot acquire the above-mentioned advantageous effect acquired by a concave lens shape. The shape of the positive lens may be a meniscus lens shape having positive power besides a biconvex shape. By forming the optical filter 4 into such a shape, the closer the light which passes through the optical filter 4 to optical axis AX, the longer an optical path of the light becomes.

A concave surface and a convex surface of the optical filter 4 which form a lens shape are formed of a spherical surface or a curved surface which is expressed by a predetermined aspherical formula such as a parabolic surface or an elliptical surface.

The illustration (FIG. 1B, FIG. 5, FIG. 7A and FIG. 7B, and the like) and the description relating to the portion surrounded by the broken line A in FIG. 1A are directly used as the description of a portion surrounded by a broken line B in FIG. 9. The optical filter 4 according to the embodiment 4 basically substantially has the same configuration as the optical filters 1, 2 and 3 according to the embodiments 1, 2 and 3 other than the power that the optical filter 4 has as a lens. Accordingly, the optical filter 4 according to the embodiment 4 acquires the corresponding advantageous effects found amongst all advantageous effects which the optical filters 1, 2 and 3 according to the embodiments 1, 2 and 3 acquire.

Embodiment 5

Figure 10:
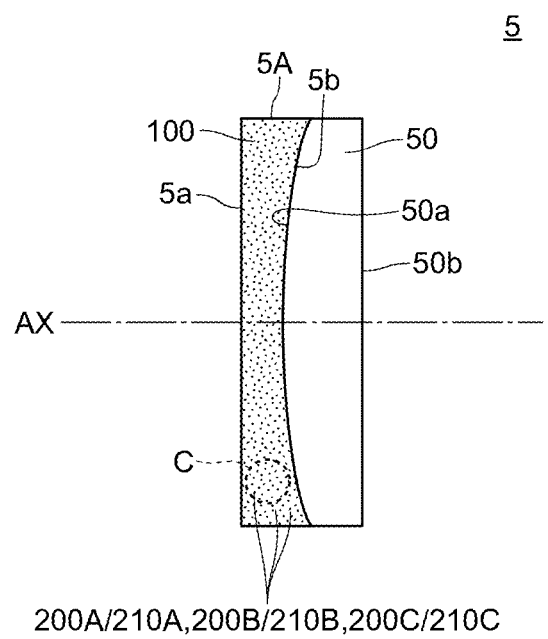
FIG. 10 is a view for describing an optical filter 5 according to an embodiment 5.

FIG. 10 is a view for describing an optical filter 5 according to the embodiment 5. FIG. 10 is a view corresponding to FIG. 1A which describes the optical filters 1, 2 and 3 according to the embodiments 1 to 3. Accordingly, the same symbols are given to constitutional elements identical with the corresponding constitutional elements in the embodiment 1, and the description in the embodiment 1 is used as the detailed description of these constitutional elements.

The optical filter 5 according to the embodiment 5 has basically substantially the same configuration as the optical filters 1, 2 and 3 according to the embodiments 1 to 3. However, the optical filter 5 according to the embodiment 5 differs from the optical filters 1, 2 and 3 according to the embodiments 1 to 3 with respect to the manner of distribution of light scattering particles (symbols being omitted in the same manner hereinafter).

In the optical filters 1, 2 and 3 according to the embodiments 1 to 3, light scattering particles are distributed over the whole thickness direction in all regions of the main surface of the base material 100 (see FIG. 1A).

On the other hand, as shown in FIG. 10, in the optical filter 5 according to the embodiment 5, when a range where the light scattering particles are distributed is viewed along a thickness direction of the optical filter 5 (a direction along an optical axis AX), the remoter a region is far from the optical axis AX, the thicker (the wider) the range where the light scattering particles are distributed becomes, compared to a region close to the optical axis AX.

As a specific structure, the optical filter 5 has a sub optical filter 5A and a transparent member 50.

The sub optical filter 5A has: a first main surface 5a formed of an approximately flat surface; and a second main surface 5b formed in a concave shape which is recessed inward. The sub optical filter 5A has negative power as a whole. The sub optical filter 5A has substantially the same configuration as the optical filter 4 according to the embodiment 4, and a plurality of light scattering particles are mixed into the base material 100.

The transparent member 50 is made of the same material as a base material 100 of the sub optical filter 5A. The transparent member 50 has a first main surface 50a formed of a convex surface shape, and a second main surface 50b formed of an approximately flat surface. The transparent member 50 is integrally formed with the sub optical filter 5A in a state where the first main surface 50a formed of a convex surface shape is laminated to a concave surface (a second main surface 5b) of the sub optical filter 5A.

The base material of the sub optical filter 5A and the transparent member 50 are made of the same material and hence, they have the same refractive index. In addition, the first main surface 5a of the sub optical filter 5A and the second main surface 50b of the transparent member 50 are set approximately parallel to each other. That is, the optical filter 5 is formed such that the power of the optical filter 5 as a lens is substantially set to 0 (zero) as a whole.

The optical filter 5 may be manufactured such that the sub optical filter 5A and the transparent member 50 are separately formed and, thereafter, both of them are laminated to each other by an adhesive agent (balsam agent) which has the homogeneous material of the base material 100. Alternatively, the optical filter 5 may be manufactured by continuously forming the sub optical filter 5A and the transparent member 50 by integral molding using a suitable method without using an adhesive agent (not shown in the drawing).

With such an optical filter 5, the light scattering particles 200A, 200B, 200C are distributed with a relatively large thickness in the region of the optical fiber 5 close to the periphery of the optical fiber 5 which is remote from the optical axis AX. Accordingly, with respect to light incident on the region close to the periphery, probability that the light impinges on the light scattering particles 200A, 200B, 200C and scatters is increased. That is, light in the region close to the periphery remote from the optical axis AX can be more positively scattered. Accordingly, in addition to the acquisition of a soft focusing effect by suppressing the occurrence of an iris phenomenon in the same manner as the optical filters 1, 2 and 3 according to the embodiments 1 to 3, it is possible to acquire image focusing in a state where the closer the periphery compared to the center of the optical filter, the larger a degree of soft focusing (blurring) becomes.

The optical filter 5 is formed such that the power becomes substantially 0 (zero). Accordingly, in an existing optical system (for example, an imaging lens unit) which has already finished an optical design, the optical filter 5 can be additionally disposed without adding a particular change in the optical design (without requiring particular consideration).

The shape of the sub optical filter 5A according to the embodiment 5 is a shape of a negative lens where the incident surface of light is a flat surface and the irradiation side is concave. It may be a shape of a negative lens where both the incident surface of light and the irradiation surface of light are formed of a concave surface. Further, it may be a shape of a meniscus lens having negative power. In this case, either one of the incident surface of light or the irradiation surface of light may be formed in a convex shape.

When these shapes are adopted, the transparent member 50, having a shape which makes the power of the optical filter 5 substantially 0 (zero), is laminated to the incident surface or the irradiation surface of the sub optical filter 5A formed in a curved surface.

The sub optical filter 5A may be formed in a positive lens shape although such a sub optical filter 5A cannot acquire the above-mentioned advantageous effect acquired by forming the sub optical filter 5A into a convex lens shape. The shape of the positive lens may be a meniscus lens shape having positive power besides a biconvex shape. By forming the sub optical filter 5A into such a shape, the closer to the optical axis AX, the longer an optical path length of the light, which passes through the optical filter 5, becomes.

A concave surface and a convex surface of the sub optical filter 5A which form a lens shape are formed of a spherical shape of a curved surface which is expressed by a predetermined aspherical formula such as a parabolic surface or an elliptical surface.

The curved surface of the sub optical filter 5A to which the transparent member 50 is laminated may be a curved surface other than a spherical surface and the above-mentioned aspherical surface or an uneven surface. Since the transparent member 50 is laminated to the sub optical filter 5A, the shape of the surface of the sub optical filter 5A does not affect the power of the optical filter 5. On the other hand, the optical filter 5 can acquire a soft focusing effect (blurring effect) corresponding to the shape of the surface of the sub optical filter 5A.

As an example of the uneven surface, the shape of a fly-eye lens or a shape of a Fresnel lens is named.

With respect to the description of a portion surrounded by a broken line C in FIG. 10, the illustration (FIG. 1B, FIG. 5, FIG. 7A and FIG. 7B and the like) and the description relating to the portion surrounded by the broken line A in FIG. 1A are directly used. The optical filter 5 according to the embodiment 5 has basically substantially the same configuration as the optical filters 1, 2 and 3 according to the embodiments 1 to 3 with respect to the configuration other than the distribution of the light scattering particles. Accordingly, the optical filter according to the embodiment 5 acquires the corresponding advantageous effects amongst all advantageous effects which the optical filters 1, 2 and 3 according to the embodiments 1 to 3 acquire.

Embodiment 6

Figure 11A:
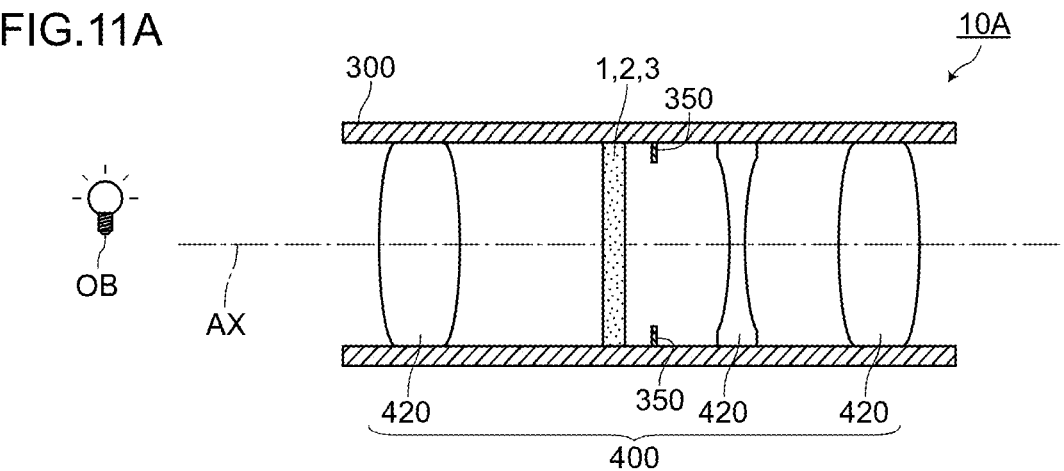
FIG. 11A, FIG. 11B and FIG. 11C are views for describing imaging lens units 10A, 10B, 10C according to an embodiment 6.
Figure 11B:
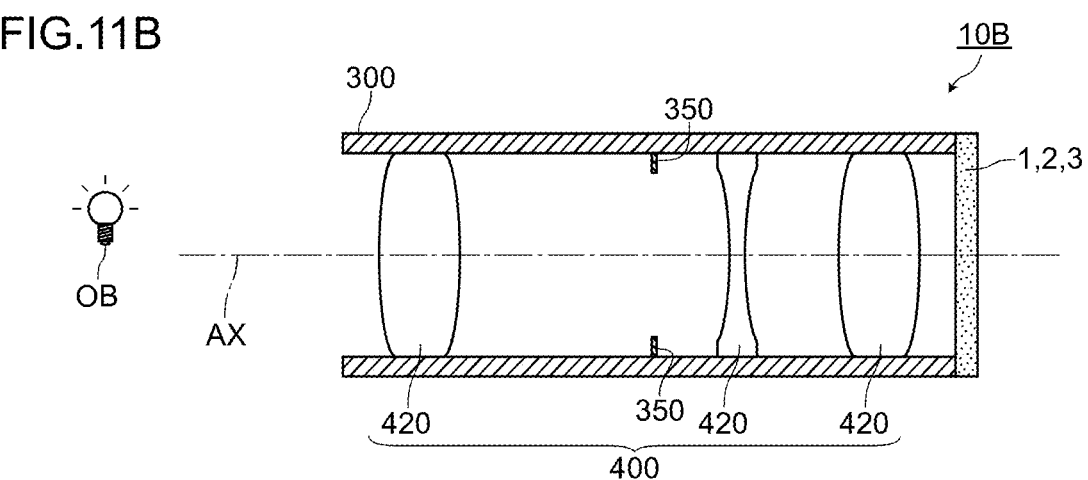
Figure 11C:
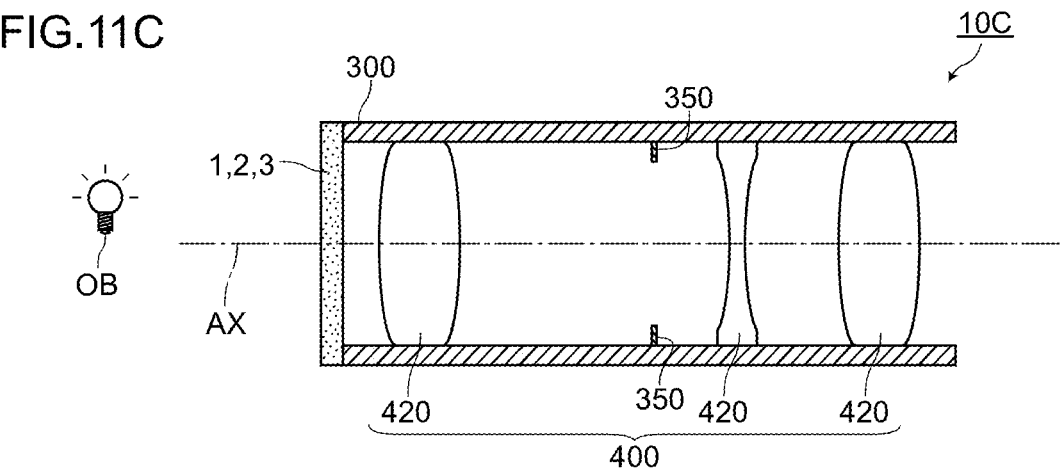

FIG. 11A, FIG. 11B and FIG. 11C are views for describing imaging lens units 10A, 10B, 10C according to the embodiment 6. FIG. 11A to FIG. 11C are schematic cross-sectional views of the imaging lens units 10A, 10B, 10C including a lens barrel 300 taken along planes which respectively include an optical axis AX.

As shown in FIG. 11A, FIG. 11B and FIG. 11C, each of the imaging lens units 10A, 10B, 10C according to the embodiment 6 includes at least an imaging lens 420, and the optical filter 1, 2 and 3 according to any one of the embodiments 1 to 3. The power (the power as a lens) of the optical filter 1, 2 and 3 is set to substantially 0 (zero).

The imaging lens unit 10A, 10B or 10C includes the lens barrel 300 and a diaphragm device 350 besides the above-mentioned constitutional elements. The imaging lens 420 is a light non-diffusion lens into which light scattering particles 200A, 200B or 200C are not mixed. The imaging lens 420 is either a concave lens or a convex lens, and has power as a lens. A group of imaging lenses 400 is formed as a whole by a plurality of imaging lenses 420. FIG. 11A, FIG. 11B and FIG. 11C schematically show an example of the imaging lens unit, and the positions where the imaging lenses 420 are arranged, the number of the imaging lenses 420 and the like are not limited to them.

In the imaging lens unit 10A shown in FIG. 11A, the optical filter 1, 2 or 3 is disposed close to the diaphragm device 350. Further, it is preferable that the optical filter 1, 2 and 3 be disposed at the position closer to the diaphragm device 350 than any one of the plurality of imaging lenses 420. In such a configuration, "the position closer to the diaphragm device 350" may be at an object-to-be-imaged side (front side) or an imaging plane side (rear side) with respect to the diaphragm device 350.

A main light beam of light from the object-to-be-imaged side (object OB side) passes the center of an aperture (optical axis AX) of the diaphragm device 350. Accordingly, by arranging the optical filter 1, 2 and 3 close to the diaphragm device 350, it is possible to provide a uniform soft focusing effect to the entire optical beams (imaging optical beams) which contribute to imaging and hence, the soft focusing effect can be uniformly given to a focused image formed on an imaging plane IP over the entire region from the region close to the center to the region close to the periphery.

In the imaging lens unit 10B shown in FIG. 11B, the optical filter 1, 2 or 3 is disposed at the position close to an imaging plane (at a side opposite to an object OB with the imaging lens unit 10B sandwiched between the object OB and the optical filter 1, 2 or 3). Further, it is preferable that the optical filter 1, 2 or 3 be disposed at the position closer to the imaging plane than any lens among the plurality of imaging lenses 420.

By arranging the optical filter 1, 2 or 3 at such a position, it is possible to allow imaging optical beams to which predetermined optical correction is applied by the group of imaging lenses 400 to pass through the optical filter 1, 2 or 3. By giving a soft focusing effect to the imaging light beams to which optical correction is applied by the group of imaging lenses 400, it is possible to acquire a focused image to which the soft focusing effect is given in a state where aberration is suppressed.

In the imaging lens unit 10C shown in FIG. 11C, the optical filter 1, 2 or 3 is disposed at the position closer to an object-to-be-imaged (object OB). Further, it is preferable that the optical filter 1, 2 and 3 be disposed at the position closer to the object to be imaged (object OB) than any lens among the plurality of imaging lenses 420.

By arranging the optical filter 1, 2 or 3 at such a position (a head of the group of imaging lenses 400), it is possible to give a soft focusing effect to imaging light beams before the imaging light beams receive a refractive action by the group of imaging lenses 400. An angle which the imaging light beams which pass through the imaging lens 420 (passes through the group of imaging lenses 400) with respect to the optical axis AX is set smaller than an imaging angle of view (an angle of imaging light beams incident on the imaging lens 420 arranged at the head of the group of imaging lenses 400 with respect to the optical axis AX). By arranging the optical filter 1, 2 or 3 at the head of the group of imaging lenses 400, the imaging light beams, which angles to the optical axis AX have not yet become small, are incident on the optical filter 1, 2 and 3. Accordingly, it is possible to easily reflect the difference in incident angles of the imaging light beams to the group of imaging lenses 400 or the positions of the imaging light beams to a soft focusing effect. Further, by arranging the group of imaging lenses 400 at a rear side of the optical filter 1, 2 or 3, a refractive action is given by the imaging lens 420 to the imaging light beams after a soft focusing effect is given. Accordingly, a design concept of the imaging lens 420 can be effectively used while giving a soft focusing effect to a focused image. There may be a case where aberration is intentionally given to the imaging lens 420 so that a taste or profoundness is given to a focused image. By arranging the optical filter 1, 2 or 3 at an object-to-be-imaged (object OB) side of the group of imaging lenses 400, it is possible to acquire a focused image where aberration is intentionally given (a design concept is effectively used). The imaging lens unit 10C exhibits a small effect to back focusing compared to the imaging lens unit 10A and the imaging lens unit 10B.

The configuration described in the embodiment 6 includes the optical filter 1, 2 or 3 according to the embodiments 1 to 3 as it is. Accordingly, the imaging lens units 10A, 10B, 10C according to the embodiment 6 acquire the corresponding advantageous effects found amongst all advantageous effects which the optical filters 1, 2 and 3 according to the embodiments 1 to 3 acquire.

Embodiment 7

Figure 12A:
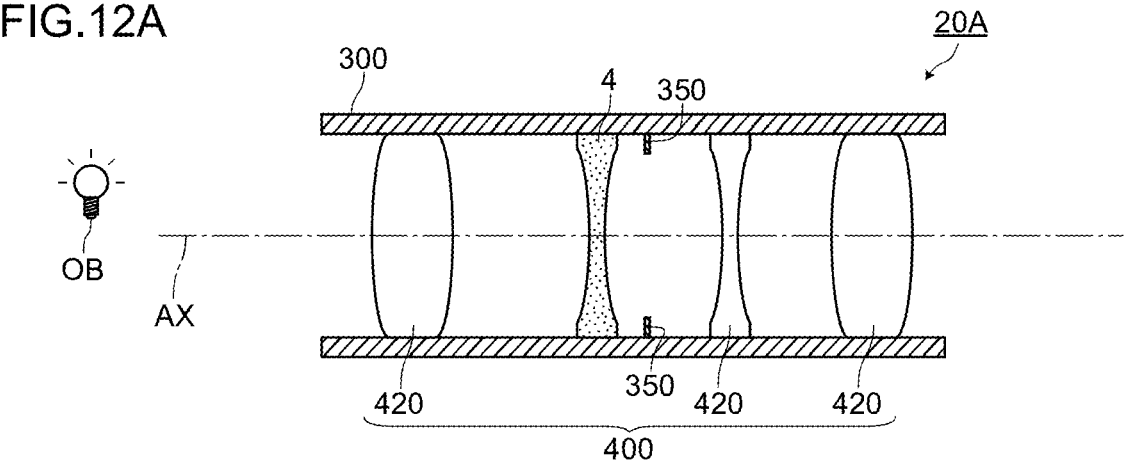
FIG. 12A, FIG. 12B and FIG. 12C are views for describing imaging lens units 20A, 20B, 20C according to an embodiment 7.
Figure 12B:
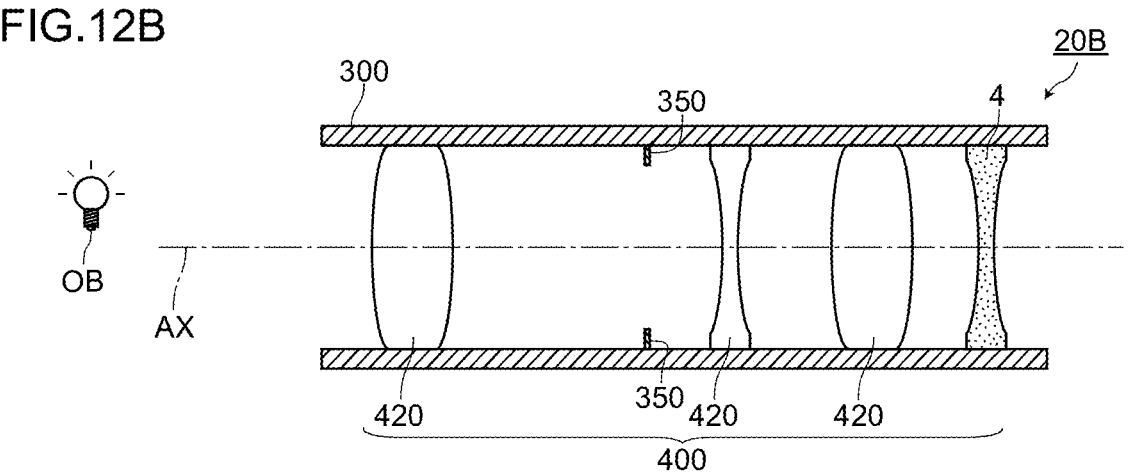
Figure 12C:
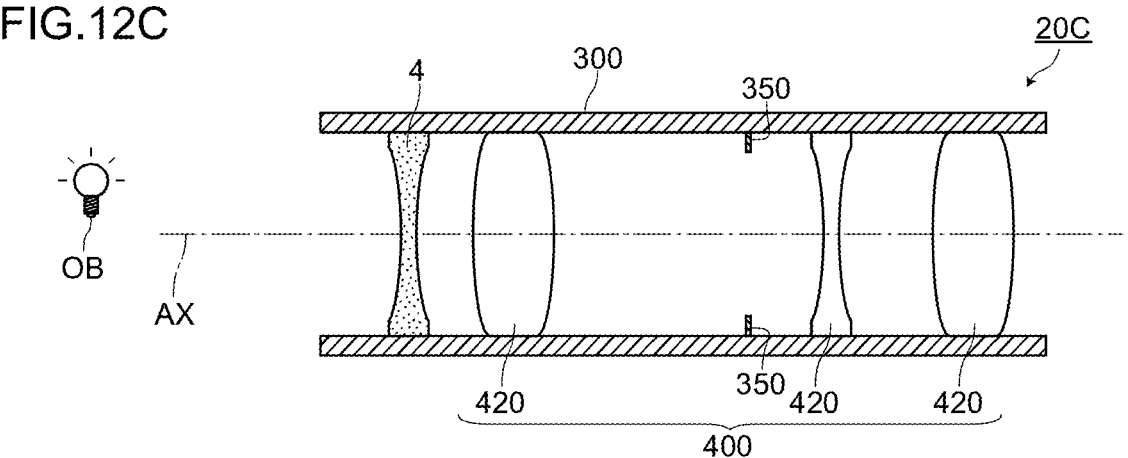

FIG. 12A, FIG. 12B and FIG. 12C are views for describing imaging lens units 20A, 20B, 20C according to the embodiment 7. FIG. 12A to FIG. 12C are schematic cross-sectional views of the imaging lens units 20A, 20B, 20C including a lens barrel 300 taken along planes which respectively include an optical axis AX.

The imaging lens units 20A, 20B, 20C according to the embodiment 7 have basically substantially the same configuration as the imaging lens units 10A, 10B, 10C according to the embodiment 6. However, the imaging lens units 20A, 20B, 20C according to the embodiment 7 differ from the imaging lens units 10A, 10B, 10C according to the embodiment 6 with respect to a point that an optical filter has negative power. In view of the above, the description will be made by focusing on differences between the embodiment 7 and the embodiment 6, and the description of constitutional elements which are substantially equal to the corresponding constitutional elements in the embodiment 6 is omitted.

As shown in FIG. 12A, FIG. 12B and FIG. 12C, the imaging lens units 20A, 20B, 20C according to the embodiment 7 include at least an imaging lens 420 and the optical filter 4 according to the embodiment 4. The optical filter 4 has negative power.

In the imaging lens unit 20A shown in FIG. 12A, the optical filter 4 is disposed close to a diaphragm device 350. Further, it is preferable that the optical filter 4 be arranged at the position closer to the diaphragm device 350 than any lens among the plurality of imaging lenses 420.

Main light beams of light from an object-to-be-imaged side (an object OB side) pass through the center of an aperture of the diaphragm device 350 (optical axis AX). Accordingly, by arranging the optical filter 4 close to the diaphragm device 350, it is possible to give a uniform soft focusing effect to the entire light beams (imaging light beams) which contribute to imaging.

Further, the optical filter 4 has a large plate thickness in a region close to a periphery remote from the optical axis AX of the optical filter 4 and hence, light which is incident on this region has a long optical path length whereby probability that the light impinges on light scattering particles and scatters is increased, and the light scatters a larger number of times. Accordingly, a periphery of a focused image can be depicted with increasing a soft focusing effect (blurring effect) (see also the description of the embodiment 4).

In the imaging lens unit 20B shown in FIG. 12B, the optical filter 4 is arranged at the position close to an imaging plane. Further, it is preferable that the optical filter 4 be arranged at the position closer to the imaging plane than the position of any lens among the plurality of imaging lenses 420.

By arranging the optical filter 4 at such a position, it is possible to acquire both the advantageous effect corresponding to the imaging lens unit 10B according to the embodiment 6 and the advantageous effect corresponding to the optical filter 4 according to the embodiment 4.

In the imaging lens unit 20C shown in FIG. 12C, the optical filter 4 is arranged at a position closer to an object to be imaged (an object OB). Further, it is preferable that the optical filter 4 be arranged at the position closer to the object to be imaged (object OB) than any lens among the plurality of imaging lenses 420.

By arranging the optical filter 4 at such a position, it is possible to acquire both the advantageous effect corresponding to the imaging lens unit 10C according to the embodiment 6 and the advantageous effect corresponding to the optical filter 4 according to the embodiment 4.

The configuration described in the embodiment 7 includes the optical filter 4 according to the embodiment 4 as it is. Accordingly, the imaging lens units 20A, 20B, 20C substantially acquire the corresponding advantageous effects found amongst all advantageous effects which the optical filter 4 according to the embodiment 4 acquires. Further, the imaging lens units 20A, 20B, 20C according to the embodiment 7 have basically substantially the same configuration as the imaging lens units 10A, 10B, 10C according to the embodiment 6 except for the point that the optical filter has the negative power. Accordingly, the imaging lens units 20A, 20B, 20C according to the embodiment acquire the corresponding advantageous effects found amongst all advantageous effects which the imaging lens units 10A, 10B, 10C according to the embodiment 6 acquire.

Embodiment 8

Figure 13A:
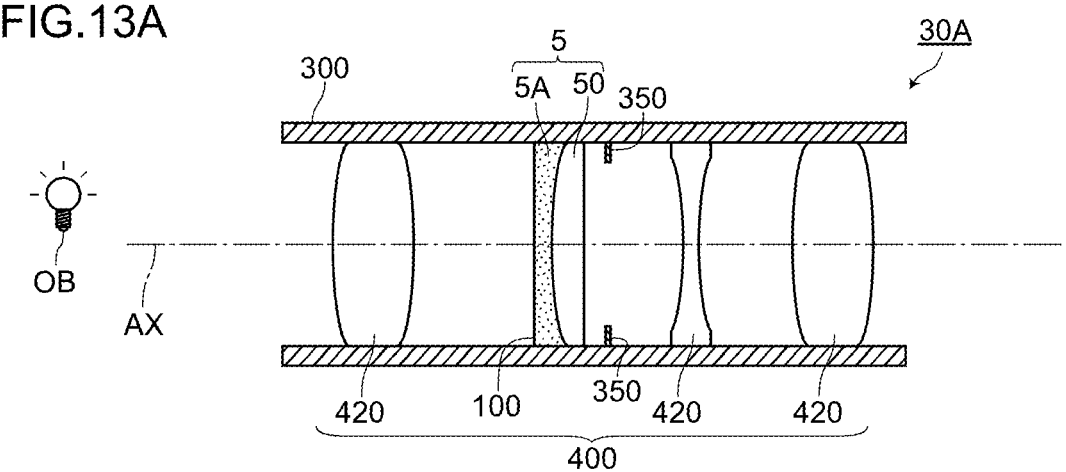
FIG. 13A, FIG. 13B and FIG. 13C are views for describing imaging lens units 30A, 30B, 30C according to an embodiment 8.
Figure 13B:
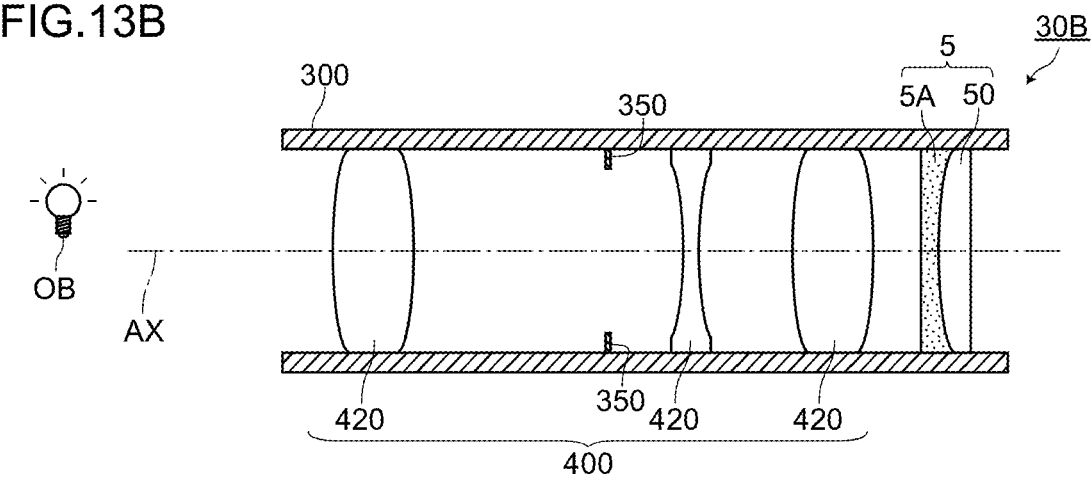
Figure 13C:
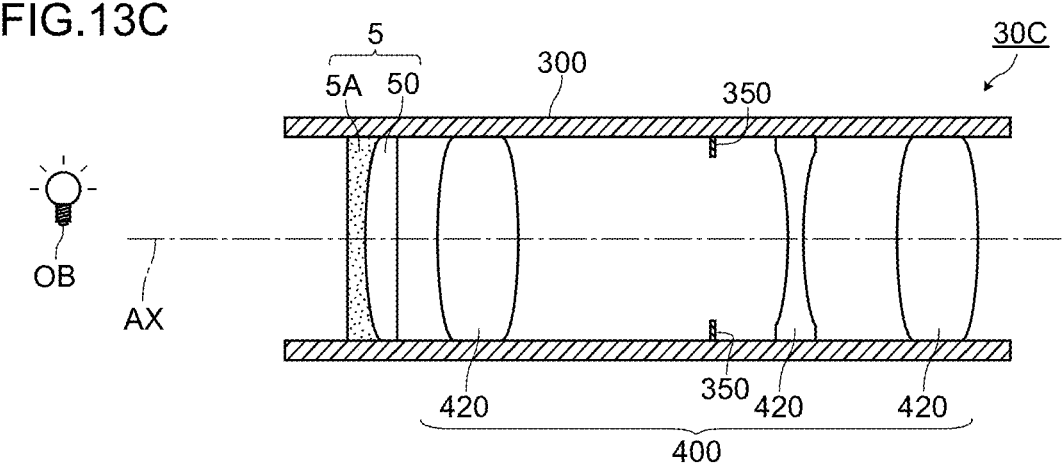

FIG. 13A, FIG. 13B and FIG. 13C are views for describing imaging lens units 30A, 30B, 30C according to the embodiment 8. FIG. 13A to FIG. 13C are schematic cross-sectional views of the imaging lens units 30A, 30B, 30C including a lens barrel 300 taken along planes which respectively include an optical axis AX.

The imaging lens units 30A, 30B, 30C according to the embodiment 8 have basically substantially the same configurations as the imaging lens units 10A, 10B, 10C according to the embodiment 6. However, the imaging lens units 30A, 30B, 30C according to the embodiment 8 differ from the imaging lens units 10A, 10B, 10C according to the embodiment 6 with respect to the manner of distributing light scattering particles in an optical filter. In view of the above, the description will be made by focusing on the difference between the embodiment 6 and the embodiment 8, and the description of constitutional elements which are substantially equal to the corresponding constitutional elements in the embodiment 6 is omitted.

As shown in FIG. 13A, FIG. 13B and FIG. 13C, the imaging lens unit 30A, 30B, 30C according to the embodiment 8 includes at least an imaging lens 420 and the optical filter 5 according to the embodiment 5. The optical filter 5 includes: the optical filter (the sub optical filter 5A) having negative power; and the transparent member 50 which is made of the same material as the base material (not shown in FIG. 13A, FIG. 13B and FIG. 13C) of the sub optical filter 5A and is integrally formed with the sub optical filter by being connected to the concave surface of the sub optical filter. The sub optical filter 5A and the transparent member 50 which are integrally formed with each other in this manner form the optical filter 5 as a whole, and power of the optical filter 5 is substantially set to 0 (zero).

In this embodiment, the optical filter 5 is substantially the same as the optical filter 5 according to the embodiment 5.

In the imaging lens unit 30A shown in FIG. 13A, the optical filter 5 is arranged close to a diaphragm device 350. Further, it is preferable that the optical filter 5 be arranged at the position closer to the diaphragm device 350 than any lens of a plurality of lenses 420.

By arranging the optical filter 5 at such a position, the imaging lens unit 30A can acquire both advantageous effects corresponding to the imaging lens unit 10A according to the embodiment 6, and the advantageous effects corresponding to the optical filter 5 according to the embodiment 5.

In the imaging lens unit 30B shown in FIG. 13B, the optical filter 5 is arranged at the position close to an imaging plane. Further, it is preferable that the optical filter 5 be arranged at the position closer to the imaging plane than the position of any lens among a plurality of imaging lenses 420.

By arranging the optical filter 5 at such a position, the imaging lens unit 30B can acquire both the advantageous effects corresponding to the imaging lens unit 10B according to the embodiment 6 and the advantageous effects corresponding to the optical filter 5 according to the embodiment 5.

In the imaging lens unit 30C shown in FIG. 13C, the optical filter 5 is arranged at the position closer to an object to be imaged (object OB). Further, it is preferable that the optical filter 5 be arranged at the position closer to the object to be imaged (object OB) than the position of any lens among a plurality of imaging lenses 420.

By arranging the optical filter 5 at such a position, the imaging lens unit 30C can acquire both the advantageous effects corresponding to the imaging lens unit 10C according to the embodiment 6 and the advantageous effects corresponding to the optical filter 5 according to the embodiment 5.

The configuration described in the embodiment 8 includes the optical filter 5 according to the embodiment 5 as it is. Accordingly, the imaging lens units 30A, 30B, 30C substantially acquire the corresponding advantageous effects found amongst all advantageous effects which the optical filter 5 according to the embodiment 5 acquires. Further, the imaging lens units 30A, 30B, 30C according to the embodiment 8 have basically substantially the same configuration as the imaging lens units 10A, 10B, 10C according to the embodiment 6 except for the manner of distributing light scattering particles of the optical filter. Accordingly, the imaging lens units 30A, 30B, 30C according to the embodiment 8 acquire the corresponding advantageous effects found amongst all advantageous effects which the imaging lens units 10A, 10B, 10C according to the embodiment 6 acquire.

EXPERIMENTAL EXAMPLES

The result of evaluation of experiment confirmed that, according to the present invention, an optical filter for soft focusing which can suppress the occurrence of an iris phenomenon can be acquired although the optical filter is an optical filter which does not use a method of roughening a surface of the optical filter. The experiment is described hereinafter.

1. Specimen

An optical filter having a flat plate shape was manufactured by mixing true spherical particles having a size (average particle size) of 4 μm into a base material at predetermined density, and such an optical filter was used as "an optical filter 9 according to a comparative example".

On the other hand, an optical filter having a flat plate shape was manufactured by mixing particles each having a konpeito (Japanese rock candy) shape where a size of a large spherical portion of a spherical particle was 4 μm into a base material at predetermined density (substantially equal to the optical filter 3 according to the embodiment 3), and such an optical filter was used as "an optical filter of the example".

2. Result of Comparison Between Optical Filter 9 According to Comparative Example and Optical Filter According to the Example.

Figure 14A:
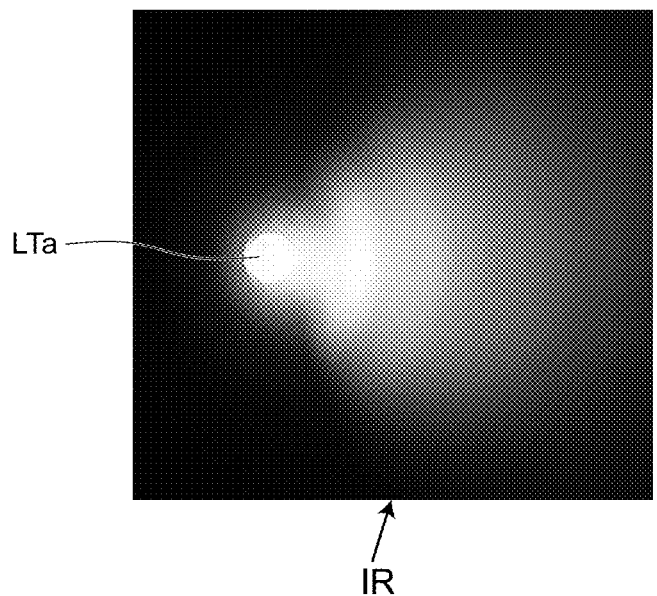
FIG. 14A and FIG. 14B are views for comparatively describing an optical filter 9 according to a comparative example and an optical filter according to the example.
Figure 14B:
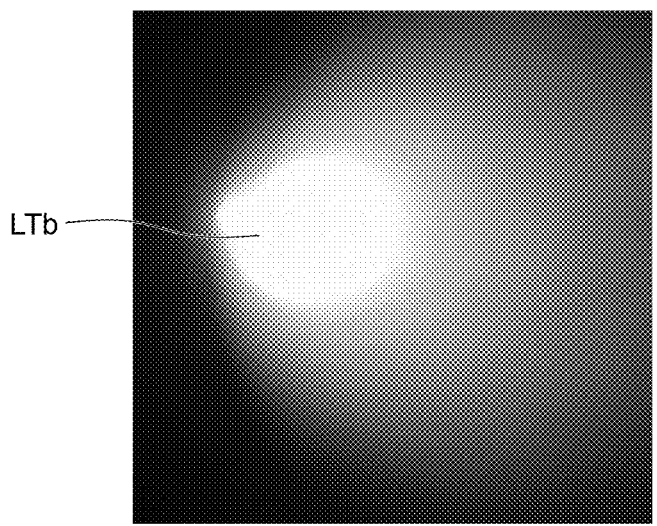

FIG. 14A and FIG. 14B are views for comparatively describing the optical filter 9 of the comparative example and the optical filter of the example. FIG. 14A is an actual photograph acquired by photographing an image formed on an imaging plane using the optical filter 9 of the comparative example, and is substantially equal to a photograph in FIG. 15B. FIG. 14B is an actual photograph acquired by photographing an image formed on an imaging plane IP using the optical filter of the example.

Figure 15A:
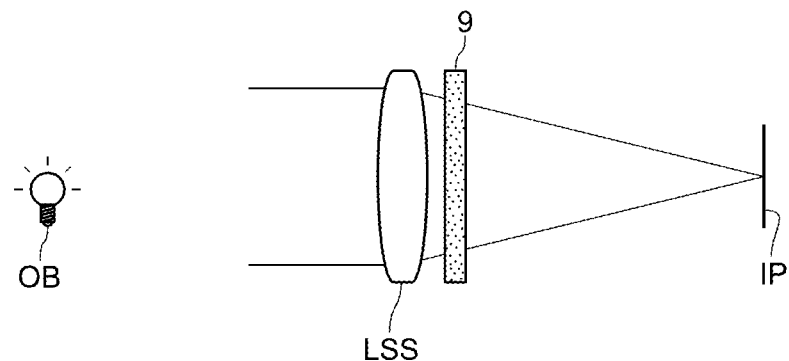
FIG. 15A and FIG. 15B are views for describing the optical filter 9 according to the comparative example.
Figure 15B:
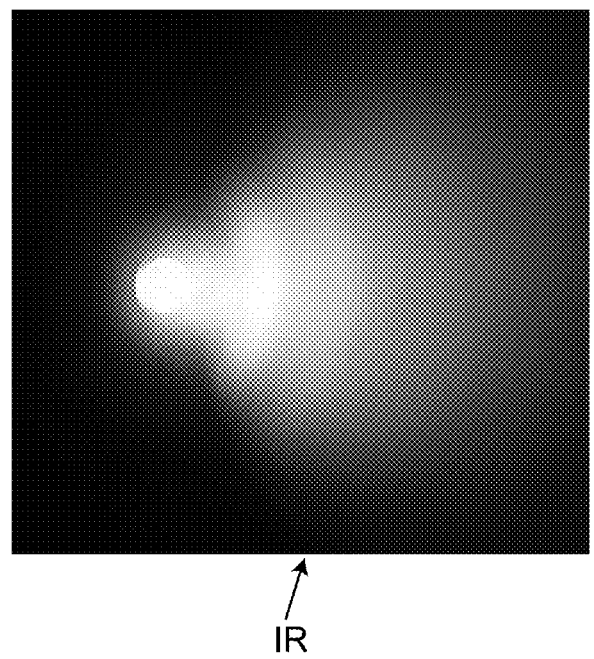

Photographing was performed in accordance with an evaluation system substantially equal to an evaluation system shown in FIG. 15A.

As shown in FIG. 14A, in the actual photograph acquired using the optical filter 9 of the comparative example, an "iris phenomenon" occurred around strong light (light LTa) projected on a video or a photograph (see symbol IR).

On the other hand, as shown in FIG. 14B, in the actual photograph acquired using the optical filter of the example which was manufactured using particles having konpeito (Japanese rock candy) shape (see FIG. 7A and FIG. 7B) as "light scattering particles", a whitish soft halo was formed around strong light (light LTb), as a whole, which was projected on a video or a photograph and hence, the example confirmed that the occurrence of an "iris phenomenon" was suppressed.

The examples described above confirmed that the optical fiber for soft focusing of the present invention, which can be manufactured without using a method of roughening a surface of the optical filter, can suppress the occurrence of an iris phenomenon.

Although the present invention has been described based on the above-mentioned embodiments, the present invention is not limited to the above-mentioned embodiments. The present invention can be carried out in various states without departing from the gist of the present invention. For example, in the above-mentioned embodiments, the number, materials, shapes, positions, sizes of the constitutional elements are provided for an exemplifying purpose, and these can be changed within a range that advantageous effects of the present invention are not impaired.

The invention claimed is:

1. An optical filter comprising:
    a base material; and
    a plurality of light scattering particles mixed into the base material, wherein
    the plurality of light scattering particles contain a plurality of scattering elements which differ from each other in a manner of appearance of "scattered light intensity distribution for respective wavelengths", the plurality of light scattering particles are formed of a plurality of particles having a spherical shape and having different sizes from each other, and wherein assuming an average particle size of the particles each having a spherical shape and contained in the optical filter as Φ and a total number of the particles having a spherical shape as Ns, the optical filter contains 0.1 Ns pieces or more of the particles having an average particle size which falls within a range of from 0.4Φ to 0.6Φ, and 0.1 Ns pieces or more of the particles having an average particle size which falls within a range of from 1.3Φ to 1.8Φ.

2. The optical filter according to claim 1, wherein the optical filter contains 0.5 Ns pieces or more of particles having a spherical shape and having an average particle size which falls within a range of from 0.9Φ to 1.1Φ.

3. The optical filter according to claim 1, wherein the plurality of particles having a spherical shape which are mixed into the base material are different by at least 8 μm or more in a particle size.

4. An imaging lens unit comprising:

an imaging lens; and an optical filter comprising:

a base material; and a plurality of light scattering particles mixed into the base material, wherein the plurality of light scattering particles contain a plurality of scattering elements which differ from each other in a manner of appearance of "scattered light intensity distribution for respective wavelengths", wherein the optical filter has negative power.

5. An imaging lens unit comprising:

an imaging lens; and an optical filter member having a negative power and including an optical filter comprising:

a base material;

a plurality of light scattering particles mixed into the base material, wherein the plurality of light scattering particles contain a plurality of scattering elements which differ from each other in a manner of appearance of "scattered light intensity distribution for respective wavelengths"; and the imaging lens unit further comprises:

a transparent member made of the same material as the base material of the optical filter, and integrally formed with the optical filter by being connected to a recessed surface of the optical filter, wherein power of an integral body formed of the optical filter and the transparent member is substantially set to 0 (zero).

* * * * *